United States Patent
Soffer

(10) Patent No.: US 9,411,766 B2
(45) Date of Patent: Aug. 9, 2016

(54) SINGLE OPTICAL FIBER KVM EXTENDER

(75) Inventor: Aviv Soffer, Caesarea (IL)

(73) Assignee: HIGH SEC LABS INC., Yokneam (IL)

( * ) Notice: Subject to any disclaimer, the term of this patent is extended or adjusted under 35 U.S.C. 154(b) by 335 days.

(21) Appl. No.: 14/343,101

(22) PCT Filed: Sep. 6, 2012

(86) PCT No.: PCT/IL2012/050353
§ 371 (c)(1),
(2), (4) Date: Mar. 6, 2014

(87) PCT Pub. No.: WO2013/035098
PCT Pub. Date: Mar. 14, 2013

(65) Prior Publication Data
US 2014/0244880 A1    Aug. 28, 2014

Related U.S. Application Data

(60) Provisional application No. 61/531,116, filed on Sep. 6, 2011.

(51) Int. Cl.
| | |
|---|---|
| *G06F 13/12* | (2006.01) |
| *H04B 10/00* | (2013.01) |
| *G06F 13/40* | (2006.01) |
| *G06F 3/02* | (2006.01) |
| *G06F 3/023* | (2006.01) |
| *H04L 5/00* | (2006.01) |
| *H04L 5/14* | (2006.01) |
| *H04L 25/02* | (2006.01) |

(52) U.S. Cl.
CPC ............ *G06F 13/4068* (2013.01); *G06F 3/023* (2013.01); *G06F 3/0227* (2013.01); *G06F 13/12* (2013.01); *G06F 13/4045* (2013.01); *H04B 10/00* (2013.01); *H04L 5/0008* (2013.01); *H04L 5/1423* (2013.01); *H04L 25/0274* (2013.01); *Y02B 60/1228* (2013.01); *Y02B 60/1235* (2013.01)

(58) Field of Classification Search
USPC ............... 710/64, 73, 106, 316; 398/140, 164
See application file for complete search history.

(56) References Cited

U.S. PATENT DOCUMENTS

| 7,184,621 B1 | 2/2007 | Zhu et al. |
|---|---|---|
| 7,730,243 B2 | 6/2010 | Kirshtein |
| 2006/0053212 A1* | 3/2006 | Lin et al. ........................ 709/217 |
| 2006/0123182 A1* | 6/2006 | Sandulescu et al. .......... 710/316 |

(Continued)

FOREIGN PATENT DOCUMENTS

| CN | 201726404 U | 1/2011 |
|---|---|---|
| WO | 2008097273 A1 | 8/2008 |
| WO | 2010020991 A2 | 2/2010 |

OTHER PUBLICATIONS

KVM over Fibre data sheet for the FPCAI-LI-UI-AB2-DBI-IB2 series Lanode Ltd. pp. 1-20 (Jan. 2010).

(Continued)

*Primary Examiner* — Khanh Dang
(74) *Attorney, Agent, or Firm* — Browdy and Neimark, PLLC

(57) ABSTRACT

Single Optical Fiber KVM (Keyboard Video Mouse) systems are provided that comprises of two subsystems: an electro-optical transmitter subsystem and an electro-optical receiver subsystem. The single optical fiber KVM is configured to support all required bi-directional communications.

20 Claims, 13 Drawing Sheets

(56) References Cited

U.S. PATENT DOCUMENTS

| | | | |
|---|---|---|---|
| 2008/0081515 A1* | 4/2008 | Wu | 439/638 |
| 2008/0205437 A1 | 8/2008 | Cole | |
| 2009/0157922 A1* | 6/2009 | Lin | 710/72 |
| 2009/0265488 A1* | 10/2009 | Birger | 710/64 |
| 2010/0124421 A1 | 5/2010 | Chand et al. | |
| 2011/0072175 A1* | 3/2011 | Liaw et al. | 710/73 |
| 2011/0157480 A1* | 6/2011 | Curl | 348/739 |
| 2011/0208963 A1 | 8/2011 | Soffer | |
| 2013/0262717 A1* | 10/2013 | Green | 710/48 |

OTHER PUBLICATIONS

CrystalView DVI Quad data sheet: DVI I HID I USB 2.0 I CATx I Fiber KVM Extender I-20, Rose Electronics, (Jan. 2006).

* cited by examiner

SINGLE OPTICAL FIBER KVM EXTENDER

FIELD OF THE INVENTION

The present invention generally relates to a fiber media KVM (Keyboard Video Mouse) extender device having a single fiber to support all required bi-directional communications. More particularly it relates to a highly integrated electro optical modules and dongles that implement secure and non secure KVM extender function.

BACKGROUND OF THE INVENTION

FIG. 1 illustrates a simplified block diagram of the transmitting subsystem 100a of a prior-art KVM Extender having multiple optical fibers 62. Optical fiber 62 may be single-mode or multi-mode types. The number of optical fibers 62 used may vary between products and it is typically between 2 and 6. In this prior-art system computer 1 is the being operated remotely by a user located at the receiving subsystem 100b illustrated in FIG. 2 below.

The term KVM Extender implies that the fiber media is used to extend Keyboard Video Mouse. Still many prior-art KVM Extender products support other interfaces such as bi-directional audio and serial communications.

Prior-art KVM Extenders are divided in two general classes based on the media used to link both ends:
  Copper KVM Extenders typically uses Ethernet cables as a
    link media. This type of products is limited in distance to
    few hundred meters due to signal quality degradation.
  Fiber optic KVM Extenders that uses one or more optical
    fibers. This type of products can reach distances as long
    as 20 km.

In this FIG. 1 and in all other figures—only fiber optic KVM Extender is shown.

Computer 1 (for example, but not limited to a PC computer) is coupled to the KVM Extender device 40 through a set of cables. Display output port 2 illustrated here as a digital output, may be DVI-D (Digital Video Interface), HDMI (High-Definition Multimedia Interface), DisplayPort or any other suitable standard. Four TMDS (Transition Minimized Differential Signaling) lanes of the display output 2a are coupled through differential pairs 22a to 22d inside the video or extender cable. The DDC (Display Data Channel) or EDID (Extended display identification data) interface section of this interface 2b provides Plug and Play data exchange between the coupled display and the computer 1. In this example, the DDC/EDID lines 28 of computer 1 are coupled to the KVM extender 40 through KVM Extender cable or video cable 29 together with the differential pairs 22a to 22d.

Legacy VGA (Video Graphics Array) standard may be coupled if prior-art KVM Extender transmitter 40 supports analog to digital conversion.

Audio out stereo jack 3 is coupled with a shielded cable 24 and 25 to extend the analog audio output over the fiber link 62. Audio extension is optional and is model dependant.

Audio output may be supported through the four display output lanes connected with differential pairs 22a to 22d if protocol used is HDMI or DisplayPort.

Audio input or microphone input jack 4 is coupled to the KVM Extender transmitter 40 through another shielded cables 26 and 27 to enable remote extension of the user microphone over the fiber link 62.

Computer 1 USB (Universal Serial Bus) port 5a is coupled to the KVM Extender transmitter 40 through USB cable 30 to enable remote extension of the user keyboard and mouse over the fiber link 62. A single USB port is typically used to deliver all USB port traffic through a USB hub located at the KVM Extender receiver subsystem.

Additional USB port 5b may be coupled to the KVM Extender transmitter 40 through another USB cable 32 to enable remote extension of other type of user peripherals such as USB mass-storage device or smart-card reader.

Some prior-art KVM Extenders 40 also support serial communication (RS-232) to enable certain control functions such as KVM control or conference room management functions. If supported, computer serial port 9 is coupled to the KVM Extender transmitter 40 through serial cable 34.

External power supply 20 coupled to the KVM Extender transmitter unit 40 through cable 87 provides low voltage DC power to supply all internal circuitry. Some prior-art KVM Extender models having larger enclosure are fitted with internal AC/DC (Alternating Current/Direct Current) power supply module.

All cables coupled to computer 1 are connected to the KVM Extender transmitter Printed Circuit Board 42 that handles all signal processing required. Typical functions including:
  1. Establishing a link with the receiver subsystem before exchanging data.
  2. Emulating DDC/EDID to the coupled computer 1 based on the display connected remotely at the other side.
  3. Emulating keyboard to deliver remote user keyboard inputs to computer 1.
  4. Emulating mouse to deliver remote user mouse inputs to computer 1.
  5. Streaming the audio channels over fiber media—converting analog audio into digital steam (Analog to Digital Conversion) and vice-versa (Digital to Analog Conversion).
  6. Streaming of digital video components over the fiber media.
  7. Streaming of USB traffic to support various high speed peripherals.
  8. Provide user interaction (user inputs and monitoring) of the device status and modes of operation.

In this prior-art KVM Extender, there are 2 optical fibers 62:
  One optical fiber is coupled to the fiber optic transmitter module 46 that is used to transmit data from KVM Extender transmitter subsystem 40 to the KVM Extender receiver 80 of FIG. 2 below.
  Another optical fiber is coupled to the fiber optic receiver module 44 that is used to receive data from KVM Extender receiver subsystem 80 of FIG. 2 below.

The KVM Extender transmitter Printed Circuit Board 42 converts all transmitted data such as video lanes, audio output, USB output etc. into a single high-speed data stream coupled to the fiber transmitter module 46 through a differential pair 50.

In the reverse direction all data received by the fiber optical receiver module 44 is coupled to the KVM Extender transmitter Printed Circuit Board 42 through differential pair 55 and separated back into various inputs such as USB keyboard, mouse, EDID etc.

Power to the fiber optic transmitter module 46 is delivered from the KVM Extender transmitter Printed Circuit Board 42 through line 48 and it is passed through the module connector 47.

Power to the fiber optic receiver module 44 is delivered from the KVM Extender transmitter Printed Circuit Board 42 through line 54.

Optical fibers 62 may be permanently attached to the optical fiber transmitter and receiver modules 46 and 44 or coupled through a removable interconnect 61 such as LC (Lucent Connector) or SC (Subscriber Connector) that fits into a matting housing 60. Fixed optical fibers are less flexible and harder to deploy but typically cost less than systems having fiber optical interconnect.

FIG. 2 illustrates a simplified block diagram of the receiving subsystem 100b of a prior-art KVM Extender having two optical fibers 62. In this prior-art system user console peripherals are coupled to the KVM Extender receiver device 80 that is remotely coupled to the computer 1 shown in FIG. 1 above.

All received data from optical fiber 62 coupled to optical fiber receiver module 44. Optical fiber receiver module 44 coverts the received optical signals into a differential electrical signal that is coupled through differential lines 82 and via the module connector 45 into the KVM Extender receiver Printed Circuit Board 86. The KVM Extender receiver Printed Circuit Board 86 processes that data received and coverts it back to the required peripheral protocols such as digital video and audio to drive user peripheral devices.

All data from local user peripheral devices is processed by the KVM Extender receiver Printed Circuit Board 86 and then passed through differential pair 84 into the optical transmitter module 46 via the module connector 47. The optical fiber transmitter module 46 converts the incoming data stream into light signals passed through optical fiber 62.

Power supply 20 coverts the mains AC voltage into low DC voltage that is passed through DC cable 87.

User display 90 is coupled to the KVM Extender receiver Printed Circuit Board 86 through video cable 89 made of four differential pairs 88a to 88d and EDID lines 99. A microcontroller inside the KVM Extender receiver Printed Circuit Board 86 reads the coupled display 90 EDID information and stream it over the optical fiber 62 to the transmitter subsystem computer 1.

User headsets or amplified speakers 96 are coupled to the KVM Extender receiver Printed Circuit Board 86 through audio out lines 91 and 92 and microphone in lines 93 and 94. The KVM Extender receiver Printed Circuit Board 86 coverts incoming data stream into analog audio through stereo Digital to Analog Converters (DACs) and incoming microphone analog signal into a digital stream through Analog to Digital Converter (ADC).

User keyboard 97 is coupled to the KVM Extender receiver Printed Circuit Board 86 through USB cable 98. In KVM Extender receiver Printed Circuit Board 86 the keyboard USB or PS/2 keystrokes information is sent over the fiber media 62 into the transmitter subsystem KVM Extender device 40 and into the coupled computer 1. Similarly, the user mouse 997 is coupled to the KVM Extender receiver Printed Circuit Board 86 through cable 102.

Optional smart-card reader 105 or other USB device may be coupled to the KVM Extender receiver Printed Circuit Board 86 through USB cable 104. All data received from that device 105 is transmitted over the optical fiber 62 into the transmitter subsystem KVM Extender device 40 and into the coupled computer 1 of FIG. 1 above.

Optional serial device 998 such as remote controller is coupled through RS-232 cable 106 into the KVM Extender receiver Printed Circuit Board 86. Serial output data is transmitted over the optical fiber 62 into the transmitter subsystem KVM Extender device 40 and into the coupled computer 1 serial port 9 of FIG. 1 above.

This prior-art KVM Extender suffers from several disadvantages:

It relies on multiple optical fibers to link between the ends. Multiple optical fibers are expensive and harder to deploy. It is also less reliable as one fiber link failure may prevent system usage.

The KVM Extender receiver and transmitter Printed Circuit Boards 42 and 86 are complex and expensive to make. It also consumes a lot of power and therefore cannot be powered by computer 1.

It does not support link security functions that may be needed in order to link between the user and a Secure KVM switch or secure KVM matrix devices.

SUMMARY OF THE INVENTION

It is provided in accordance to an exemplary embodiment of the current invention, a Single Optical Fiber KVM system is provided comprising:

an electro-optical transmitter subsystem that is locally electrically coupled to a computer, KVM switch or KVM matrix on one side and optically remotely coupled to a receiver subsystem on the other side, having:

an CWDM (Course Wave-Division Multiplexing) optical multiplexer de-multiplexer coupled to a single optical fiber;

at least two VCSEL devices optically coupled to the CWDM optical multiplexer de-multiplexer;

at least one PIN Diode device optically coupled to the CWDM optical multiplexer de-multiplexer; and at least one microcontroller and additional electronic circuitry to interface said VCSEL and PIN Diode with a standard PC video output, keyboard and mouse ports;

and an electro-optical receiver subsystem that is locally electrically coupled to user peripherals on one side and optically remotely coupled to transmitter subsystem on the other side, having:

an CWDM (Course Wave-Division Multiplexing) optical multiplexer de-multiplexer coupled to the same single optical fiber;

At least one VCSEL device generating wavelength compatible to transmitter side VCSEL, optically coupled to the CWDM optical multiplexer de-multiplexer;

at least two PIN Diodes sensitive to the same wavelength of the VCSEL devices in the transmitter subsystem, optically coupled to the CWDM optical multiplexer de-multiplexer; and at least one microcontroller and additional electronic circuitry to interface said VCSEL and PIN Diodes with a standard set of peripherals having at least one user display, one keyboard and one mouse.

In some embodiments the electro-optical transmitter and receiver are substantially based on small standard form-factor integrated modules.

In some embodiments the transmitter subsystem is substantially based on Optical Sub Assembly having:

Said CWDM optical multiplexer de-multiplexer;
4×high-speed VCSEL to transmit four digital video lanes;
4×high-speed VCSEL laser driver circuitry;
1×low-speed VCSEL to transmit non-video data; and
1×low-speed PIN Diode to receive non-video data;
and wherein said receiver subsystem is substantially based on Optical Sub Assembly having:
said CWDM optical multiplexer de-multiplexer;
4×high-speed PIN Diodes to receive four digital video lanes;
4×high-speed PIN Diode receiver circuitry;
1×low-speed VCSEL to transmit non-video data; and
1×low-speed PIN Diode to receive non-video data.

In some embodiments the electro-optical transmitter is further comprising of EDID emulation function to support automatic detection of display settings, and wherein receiver subsystem is further comprising of means to read coupled display EDID content and deliver it over the said low-speed channel to the said EDID emulation function.

In some embodiments the electro-optical transmitter is further comprising of a keyboard device emulation function to emulate a keyboard in front of the coupled computer or KVM switch or KVM matrix, and wherein receiver subsystem is further comprising of keyboard host emulator coupled to user keyboard to capture user inputs and deliver it over the said low-speed channel to the said keyboard device emulation function.

In some embodiments the electro-optical transmitter is further comprising of a mouse device emulation function to emulate a mouse in front of the coupled computer or KVM switch or KVM matrix, and wherein receiver subsystem is further comprising of mouse host emulator coupled to user mouse to capture user inputs and deliver it over the said low-speed channel to the said mouse device emulation function.

In some embodiments the electro-optical transmitter is further comprising of an audio CODEC function to convert one or more analog audio signals received from the coupled computer or KVM switch or KVM matrix into digital stream and deliver it over the said low-speed channel to the receiver subsystem, and wherein receiver subsystem is further comprising of a similar audio CODEC function coupled to user headset or speakers to receive said digital audio stream and convert it back into one or more analog audio signals.

In some embodiments the electro-optical receiver is further comprising of an audio CODEC function to convert one or more analog audio signals received from the coupled microphone or audio source into digital stream and deliver it over the said low-speed channel to the transmitter subsystem, and wherein transmitter subsystem is further comprising of a similar audio CODEC function coupled to computer or KVM switch or KVM matrix to receive said digital audio stream and convert it back into one or more analog audio signals.

In some embodiments the electro-optical receiver is further comprising of a user authentication device port coupled to user authentication device that converts data exchanged with the device into a digital stream and deliver it over the said low-speed channel to the transmitter subsystem and vice versa, and wherein transmitter subsystem is further comprising of a compatible user authentication device port function coupled to computer or KVM switch or KVM matrix to receive said digital stream and convert it back into data structure identical to the data originally exchanged with the user authentication device.

In some embodiments the said electro-optical receiver is further comprising of a Remote Desktop Controller (RDC) port coupled to RDC device that converts data exchanged with the RDC into a digital stream and deliver it over the said low-speed channel to the transmitter subsystem and vice versa, and wherein transmitter subsystem is further comprising of a compatible RDC port function coupled to KVM switch or KVM matrix to receive said digital stream and convert it back into data structure identical to the data originally exchanged with the RDC device.

In some embodiments the said electro-optical receiver is further comprising of a serial communication port function coupled to an external device having serial interface that converts data exchanged with the external device into a digital stream and deliver it over the said low-speed channel to the transmitter subsystem and vice versa, and wherein transmitter subsystem is further comprising of a compatible serial communication port function coupled to computer, KVM switch or KVM matrix to receive said digital stream and convert it back into data structure identical to the data originally exchanged with the external device.

In some embodiments the electro-optical receiver is further comprising of a general purpose peripheral port function coupled to an external peripheral device that converts data exchanged with the external peripheral device into a digital stream and deliver it over the said low-speed channel to the transmitter subsystem and vice versa, and wherein transmitter subsystem is further comprising of a compatible general purpose peripheral port function coupled to computer, KVM switch or KVM matrix to receive said digital stream and convert it back into data structure identical to the data originally exchanged with the external peripheral device.

In some embodiments one or more of the said subsystems is powered by external device peripheral port such as USB.

In some embodiments one or more subsystems is configured as a dongle having cables permanently attached to it through plastic over-mold.

In some embodiments the optical fiber is coupled through standard interconnect to enable separation of the optical fiber from the said transmitter or receiver modules.

In some embodiments the said subsystems are further comprises of a security module designed to provide one or more security services selectable from the list of: two side authentication and pairing, traffic encryption decryption, anti-tampering.

In some embodiments the subsystems are further comprising of one or more LEDs to indicate subsystem operational status such as link and power.

In some embodiments the system further comprising of unidirectional data flow enforcing circuitry coupled to one or more supported user peripherals to reduce data leakages risks.

In some embodiments the wherein subsystems are further comprising of internally powered anti-tampering system to detect an unauthorized attempts to penetrate and tamper with the subsystem internal circuitry.

According to another exemplary embodiment of the current invention, a multiple Optical Fiber KVM system comprising:

two or more electro-optical transmitter subsystems that are locally electrically coupled to one or more computers, KVM switches or KVM matrixes on one side and optically remotely coupled to a receiver subsystem on the other side, each having:

an CWDM (Course Wave-Division Multiplexing) optical multiplexer de-multiplexer coupled to a single optical fiber;

at least two VCSEL devices optically coupled to the CWDM optical multiplexer de-multiplexer;

at least one PIN Diode device optically coupled to the CWDM optical multiplexer de-multiplexer;

at least one microcontroller and additional electronic circuitry to interface said VCSEL and PIN Diode with a standard PC video output, keyboard and mouse ports;

two or more electro-optical receiver subsystems that are locally electrically coupled to user peripherals on one side and optically remotely coupled to transmitter subsystem on the other side, each having:

an CWDM (Course Wave-Division Multiplexing) optical multiplexer de-multiplexer coupled to the same single optical fiber;

at least one VCSEL device generating wavelength compatible to transmitter subsystem VCSEL, optically coupled to the CWDM optical multiplexer de-multiplexer;

at least two PIN Diodes sensitive to the same wavelength of the VCSEL devices in the transmitter subsystem, optically coupled to the CWDM optical multiplexer de-multiplexer;

at least one microcontroller and additional electronic circuitry to interface said VCSEL and PIN Diodes with a standard set of peripherals having at least one user display, one keyboard and one mouse, wherein the two or more set of receiver subsystems are used to drive two or more user display or one or more user displays having a dual-link DVI interface.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural, logical or method steps details of the invention in more detail than is necessary for a fundamental understanding of the invention, the description taken with the drawings making apparent to those skilled in the art how the several forms of the invention may be embodied in practice.

In discussion of the various figures described herein below, like numbers refer to like parts.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Figure 5:
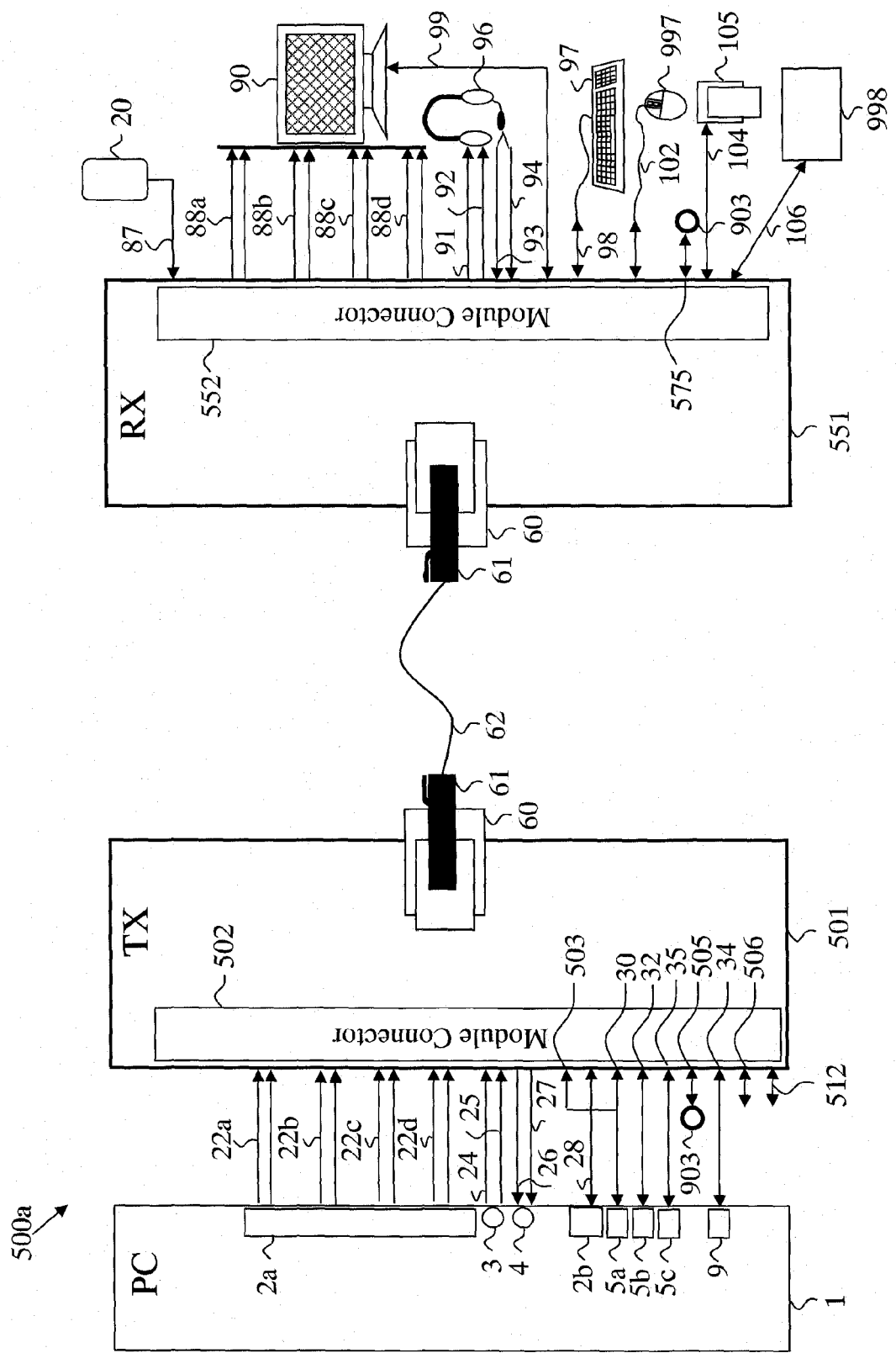

FIG. 5 illustrates a high-level block-diagram of an exemplary embodiment of the present invention that provides a KVM Extender function over a single fiber. In this figure the KVM Extender transmitter and receiver are uses a highly integrated modules of the current invention. The transmitter module in this figure is coupled electrically directly to a computer.

Figure 6:
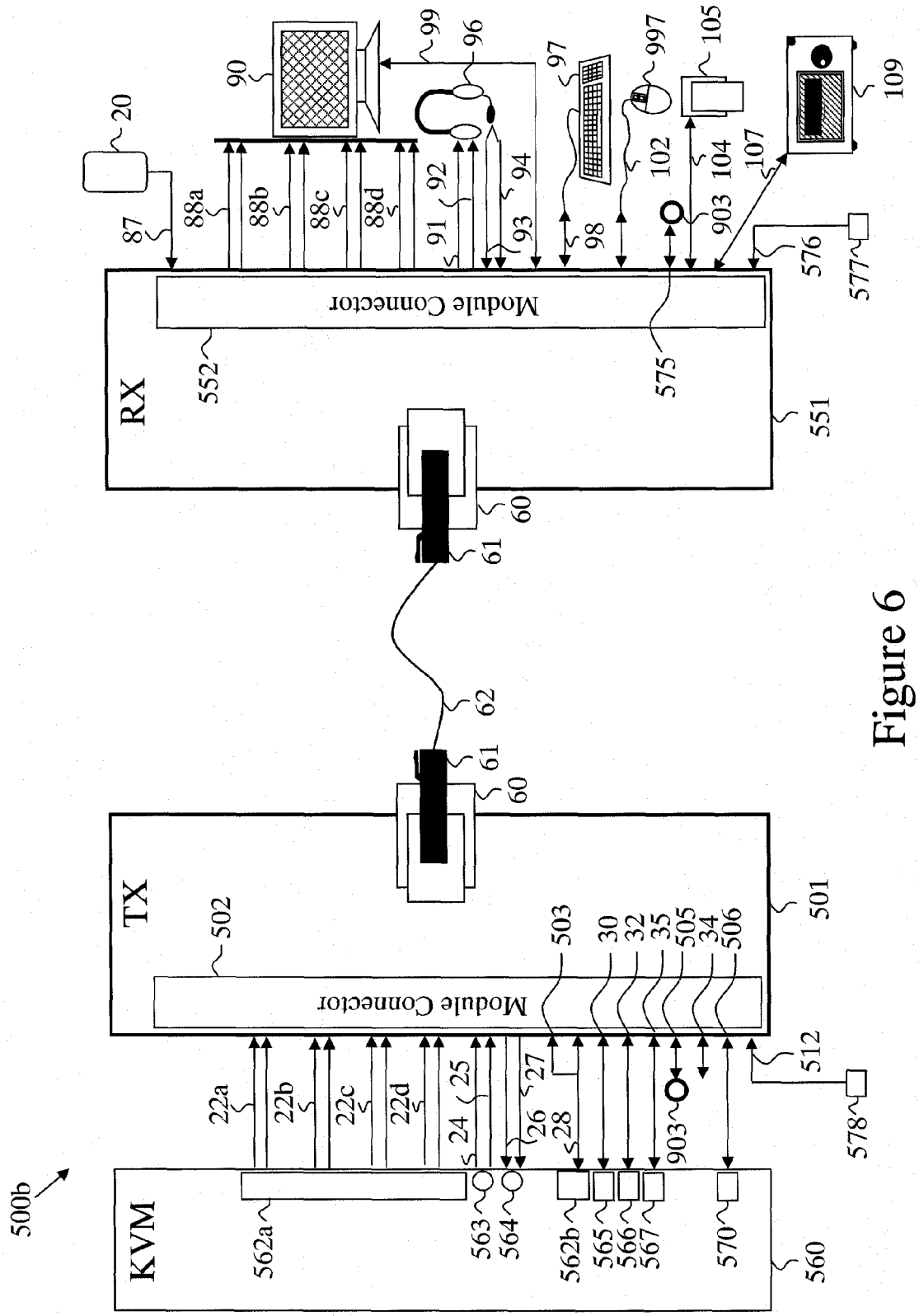

FIG. 6 illustrates a high-level block-diagram of an exemplary embodiment of the present invention that provides a KVM Extender function over a single fiber. This system of this figure is similar to the system of FIG. 5 above but in this figure the transmitter module is coupled directly to a Secure or non-secure KVM switch or KVM matrix instead of a computer.

Figure 7:
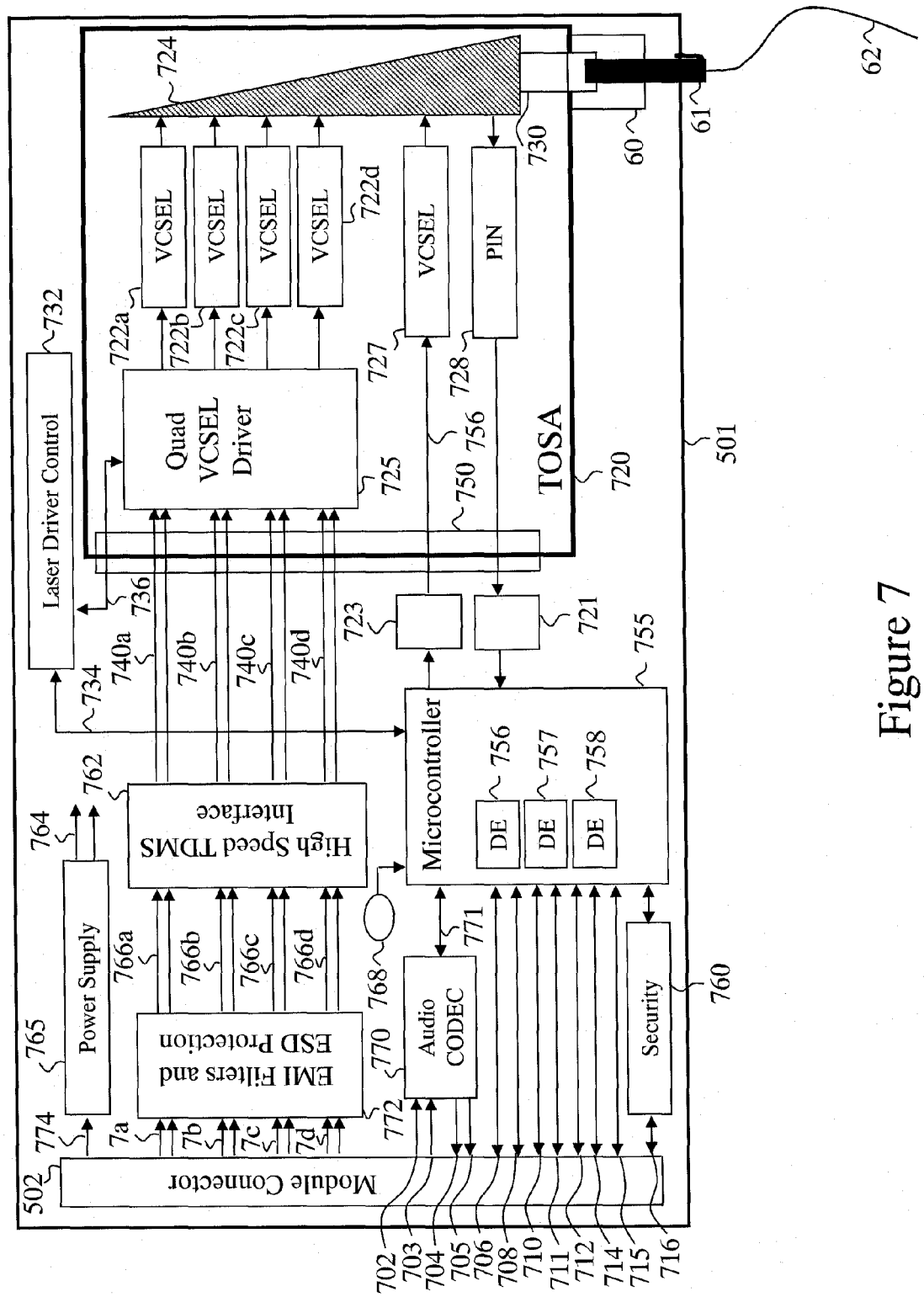

FIG. 7 illustrates a detailed block-diagram presenting the internal components of the highly integrated single optical fiber KVM Extender transmitter module of the current invention.

Figure 8:
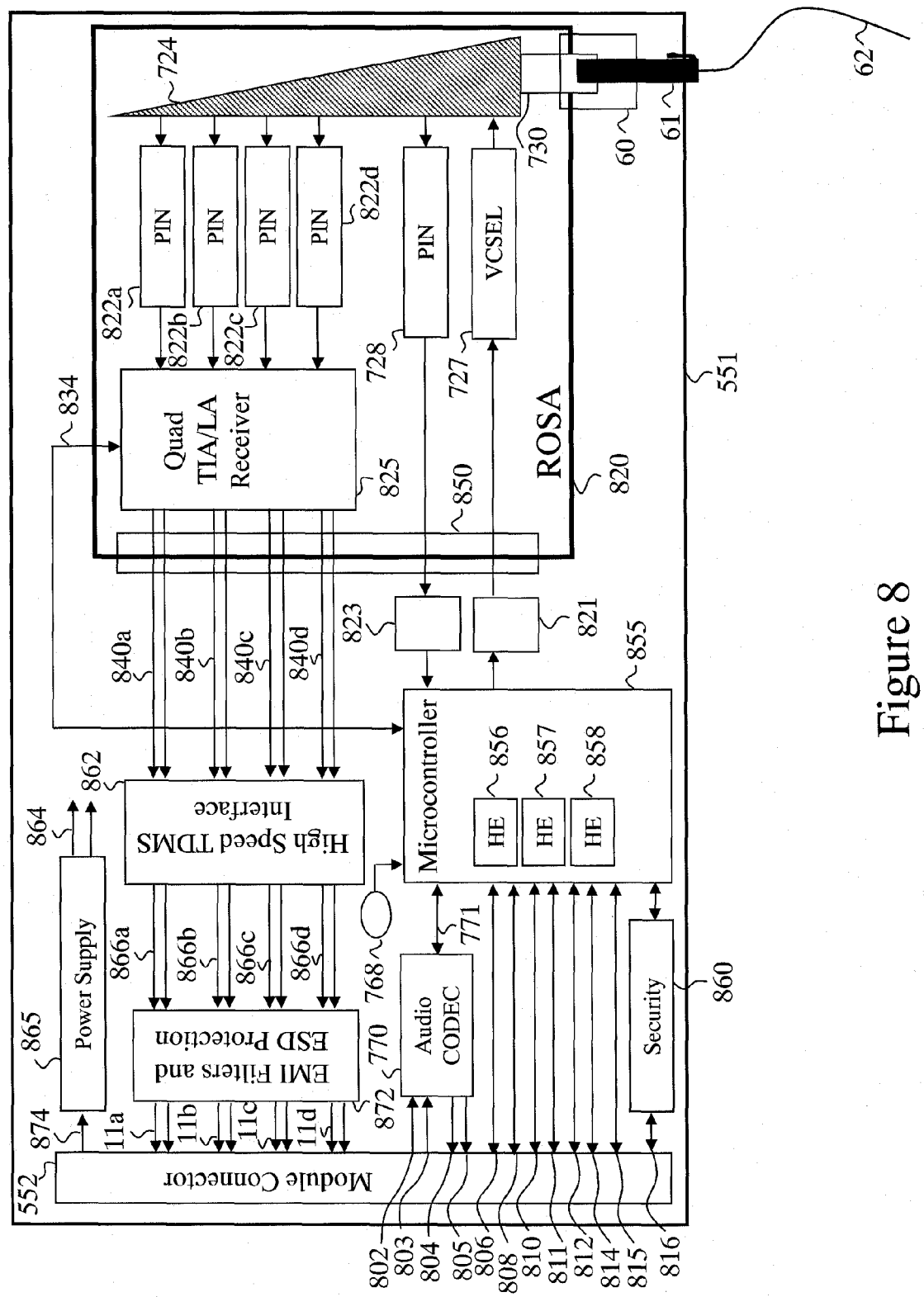

FIG. 8 illustrates a detailed block-diagram presenting the internal components of the highly integrated single optical fiber KVM Extender receiver module of the current invention.

Figure 9:
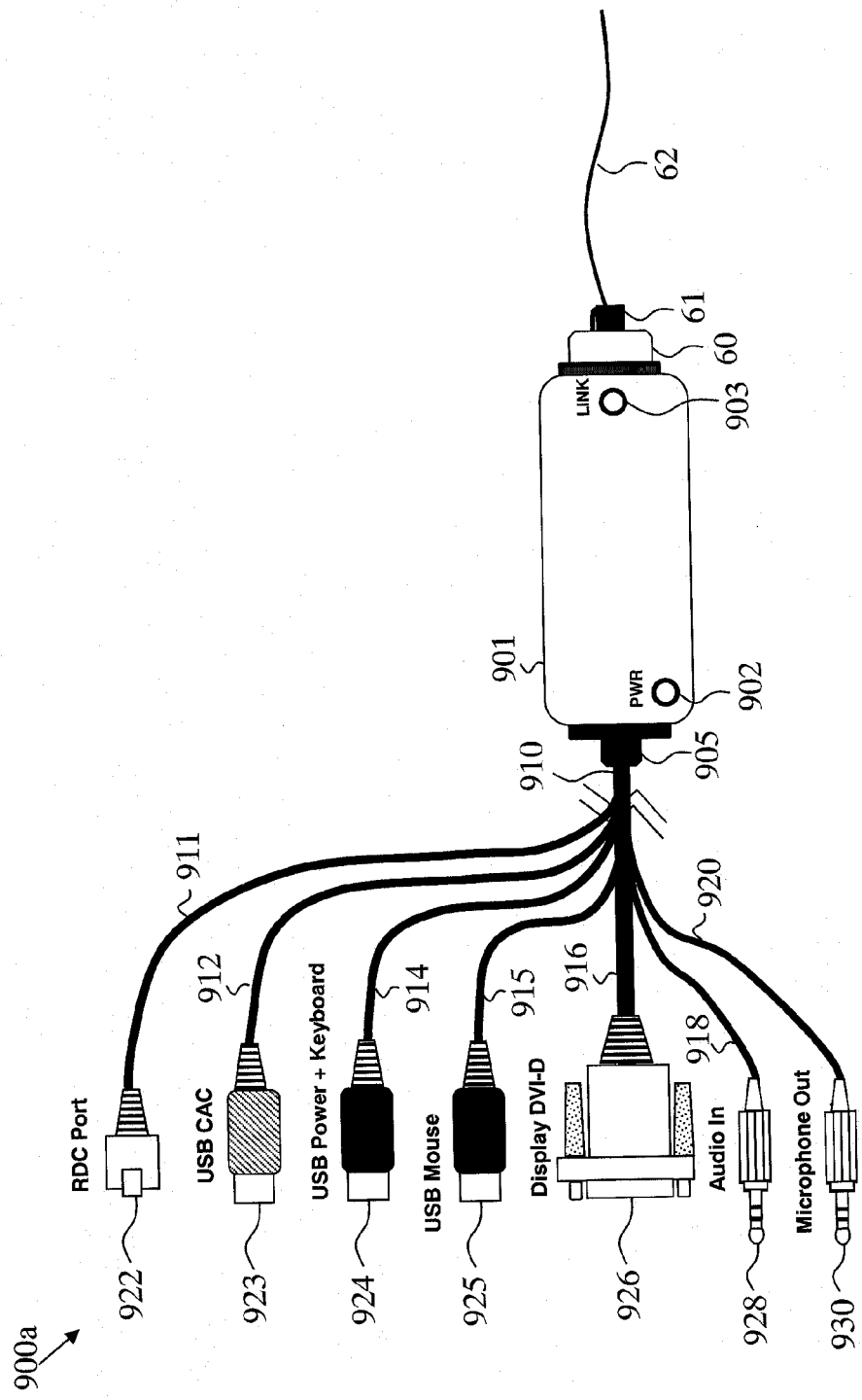

FIG. 9 illustrates an external view of a single optical fiber KVM Extender transmitter dongle exemplary apparatus of the current invention based on the transmitter module illustrated in FIG. 7 above.

Figure 10:
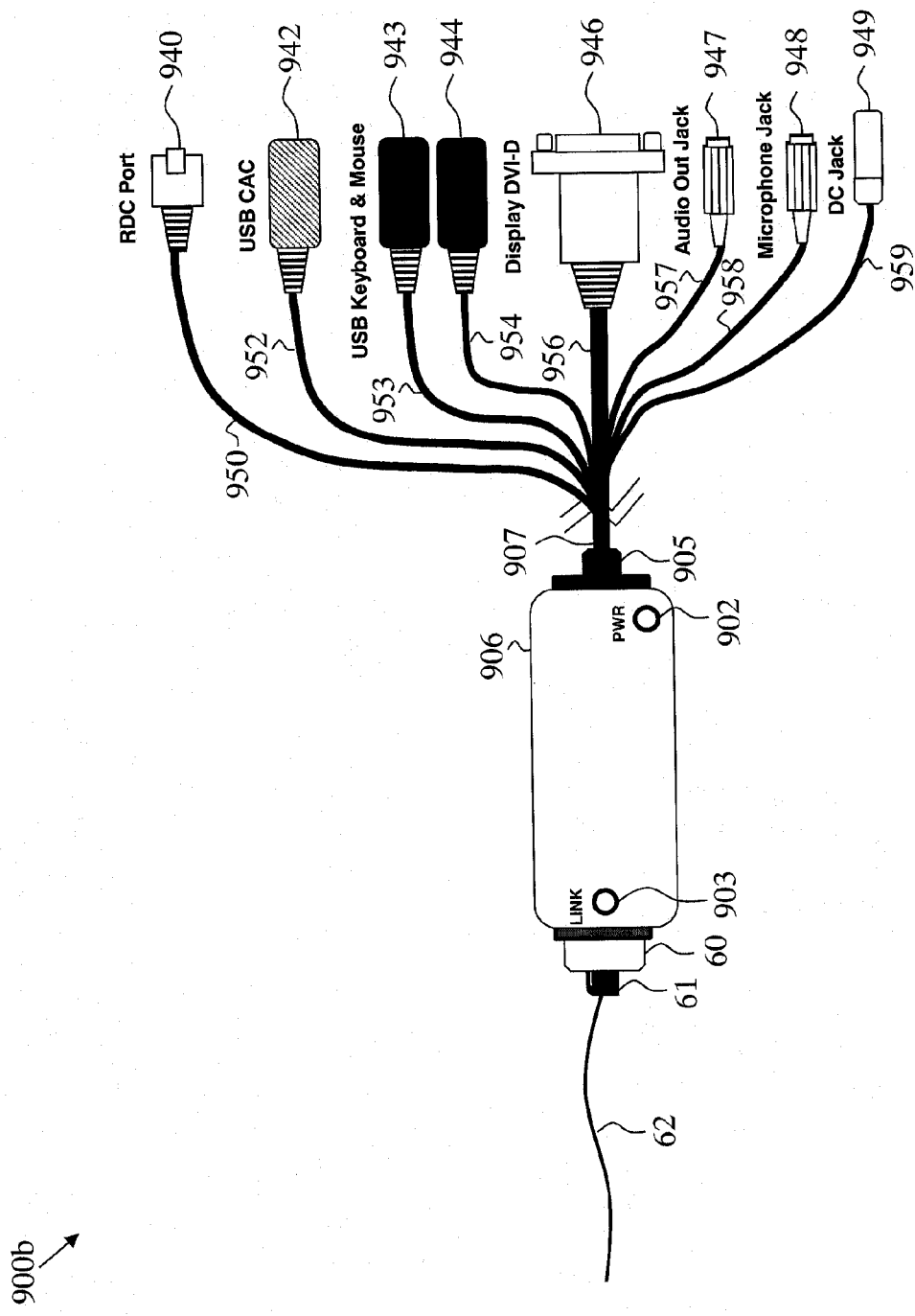

FIG. 10 illustrates an external view of a single optical fiber KVM Extender receiver dongle exemplary apparatus of the current invention based on the receiver module illustrated in FIG. 8 above.

Figure 11:
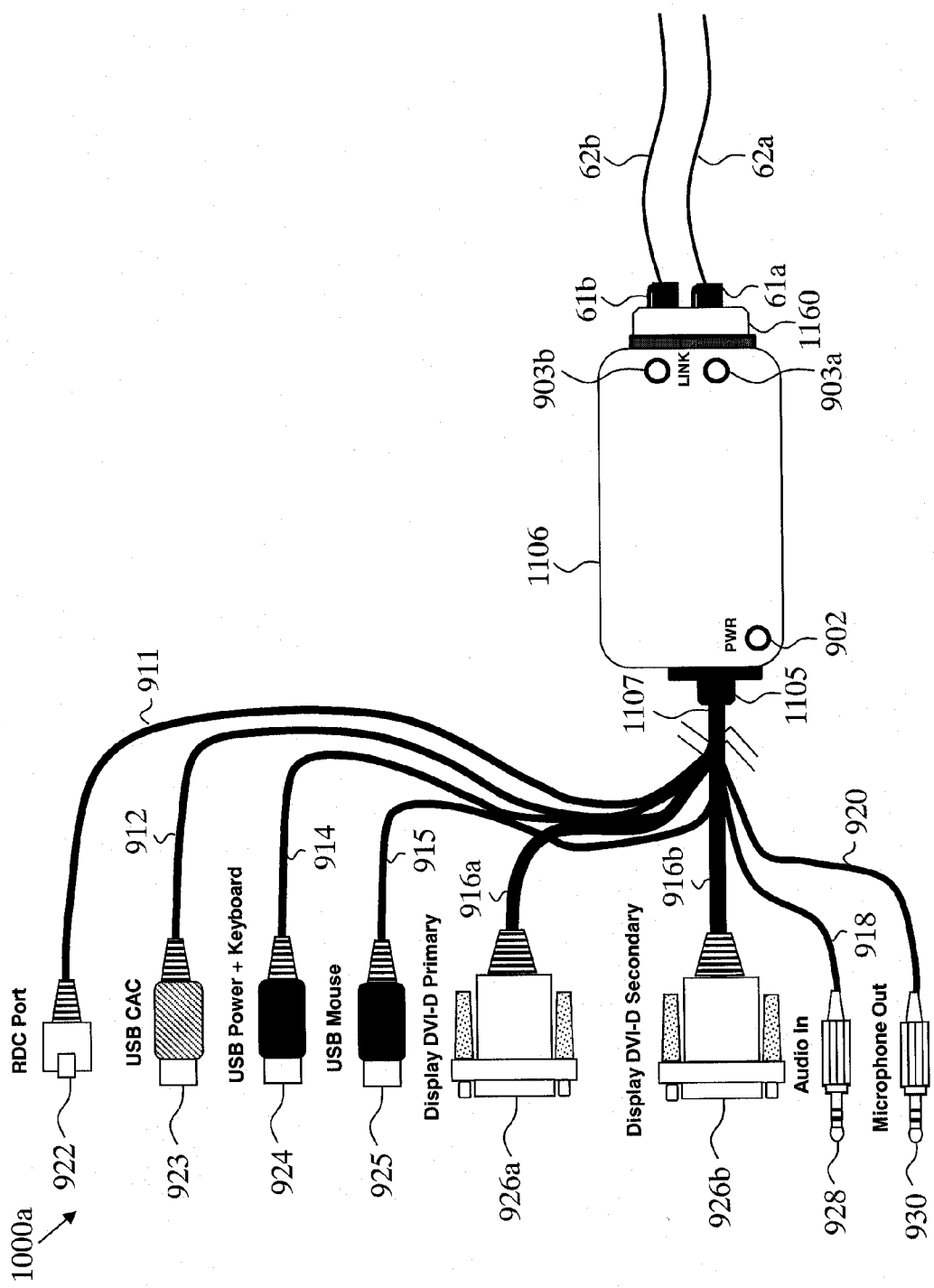

FIG. 11 illustrates an external view of a dual optical fiber KVM Extender transmitter dongle exemplary apparatus of the current invention based on two transmitter modules illustrated in FIG. 7 above.

Figure 12:
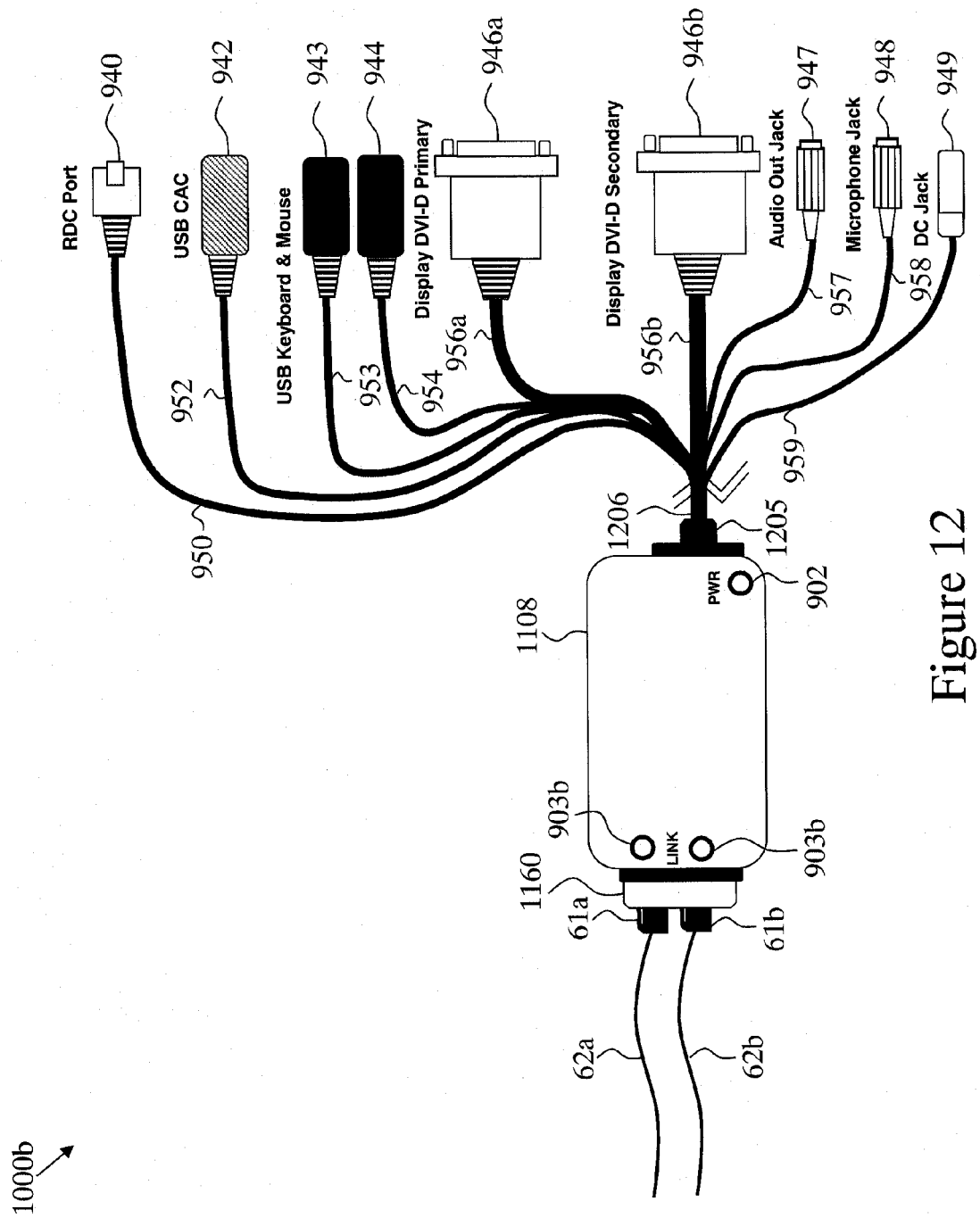

FIG. 12 illustrates an external view of a dual optical fiber KVM Extender receiver dongle exemplary apparatus of the current invention based on two receiver modules illustrated in FIG. 8 above.

Figure 13:
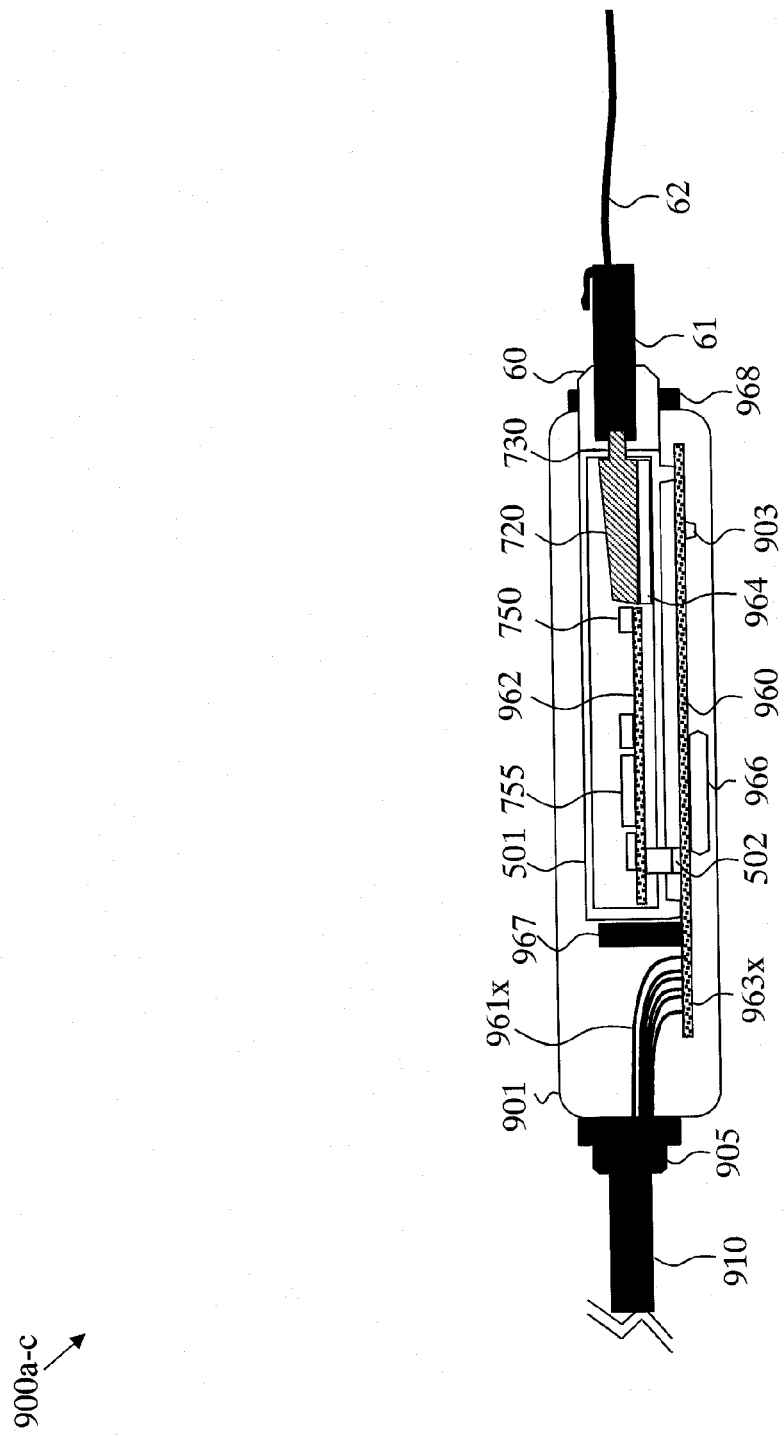

FIG. 13 illustrates a side cross-sectional view of the single optical fiber KVM Extender transmitter dongle exemplary apparatus of the current invention illustrated in FIG. 9 above.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

In the drawings, some logical connections are drawn as arrows indicating the direction of data flow. Some connections are specifically marked with two ends arrow to indicate bi-directional data flow. However, some bidirectional data connections are drawn without arrow heads as to not crowd the drawings. Video data channels may be drawn in heavy lines to indicate the higher bandwidth of these channels. Arrows drawn within switches boxes should not be interpreted as indicating direction of data flow.

Figure 1:
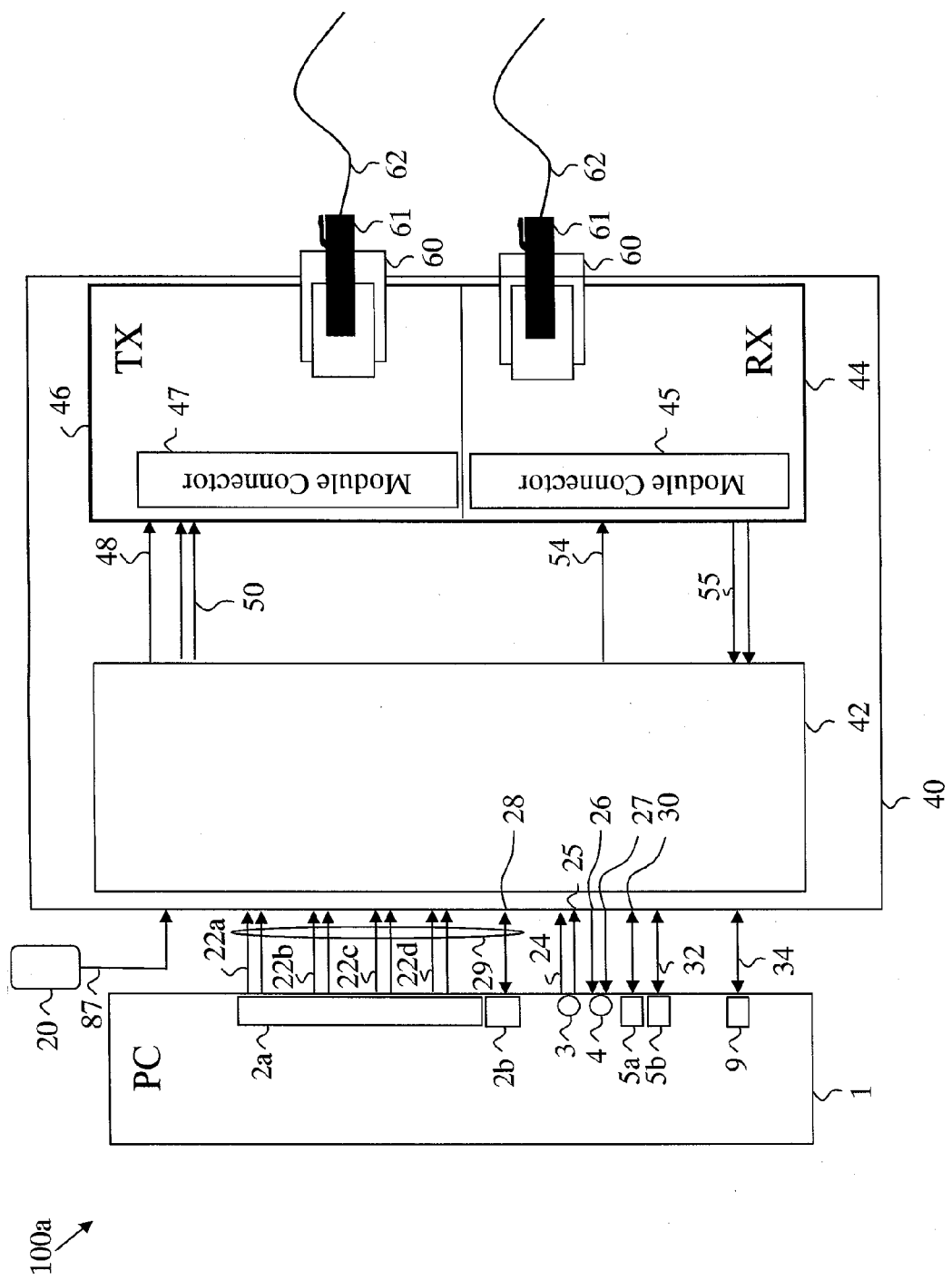
FIG. 1 illustrates a high-level block-diagram of the transmitter subsystem of a prior art multiple fiber optic KVM Extender system. In this figure the transmitter is coupled to a single computer.
Figure 2:
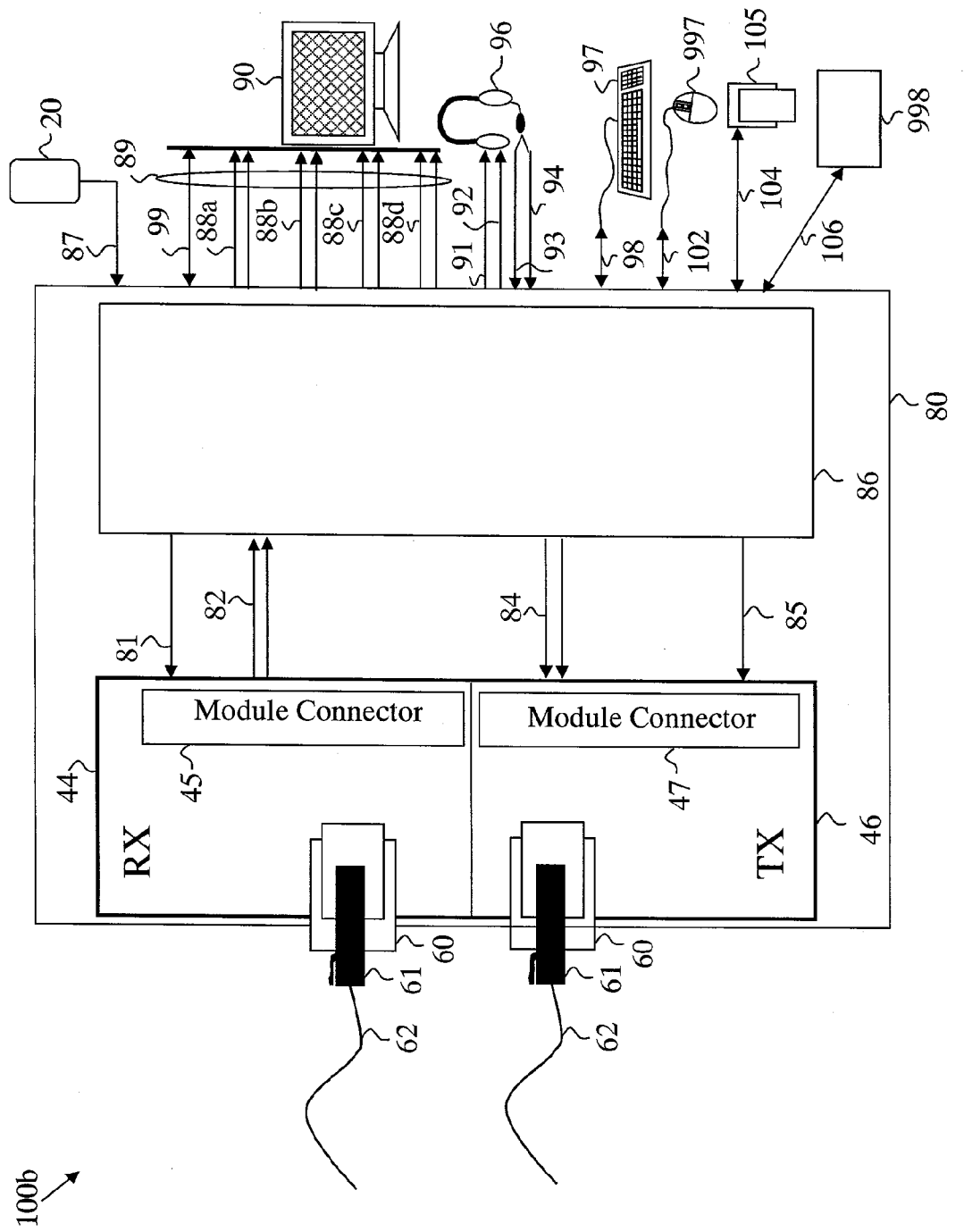
FIG. 2 illustrates a high-level block-diagram of the receiver subsystem of the same prior art system illustrated in FIG. 1 above. In this figure the receiver is coupled to a set of user peripherals such as display, keyboard, mouse etc.
Figure 3:
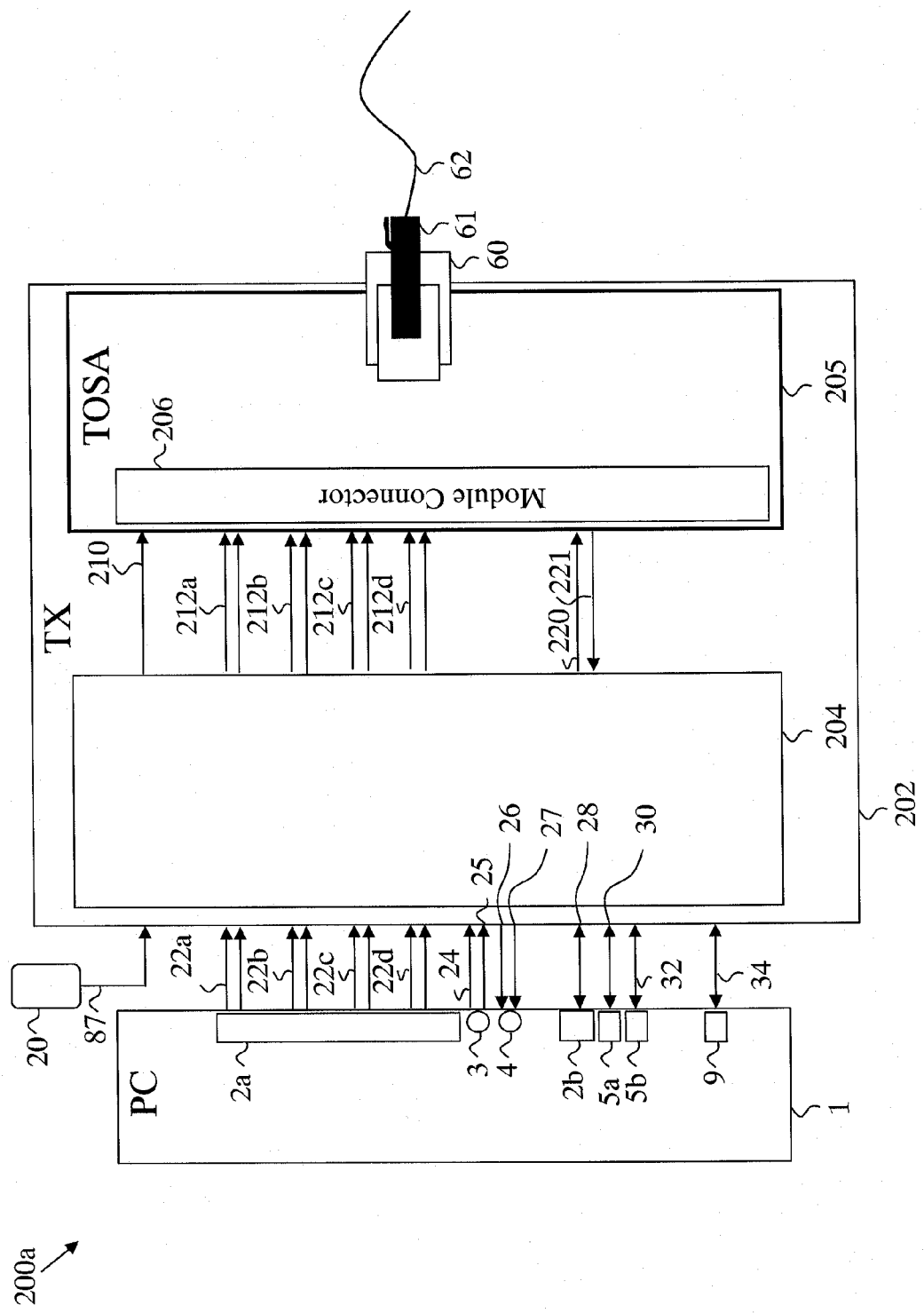
FIG. 3 illustrates a high-level block-diagram of an exemplary embodiment of the present invention that provides a KVM Extender transmitter function over a single fiber. In this figure the KVM Extender transmitter is coupled to a computer.
Figure 4:
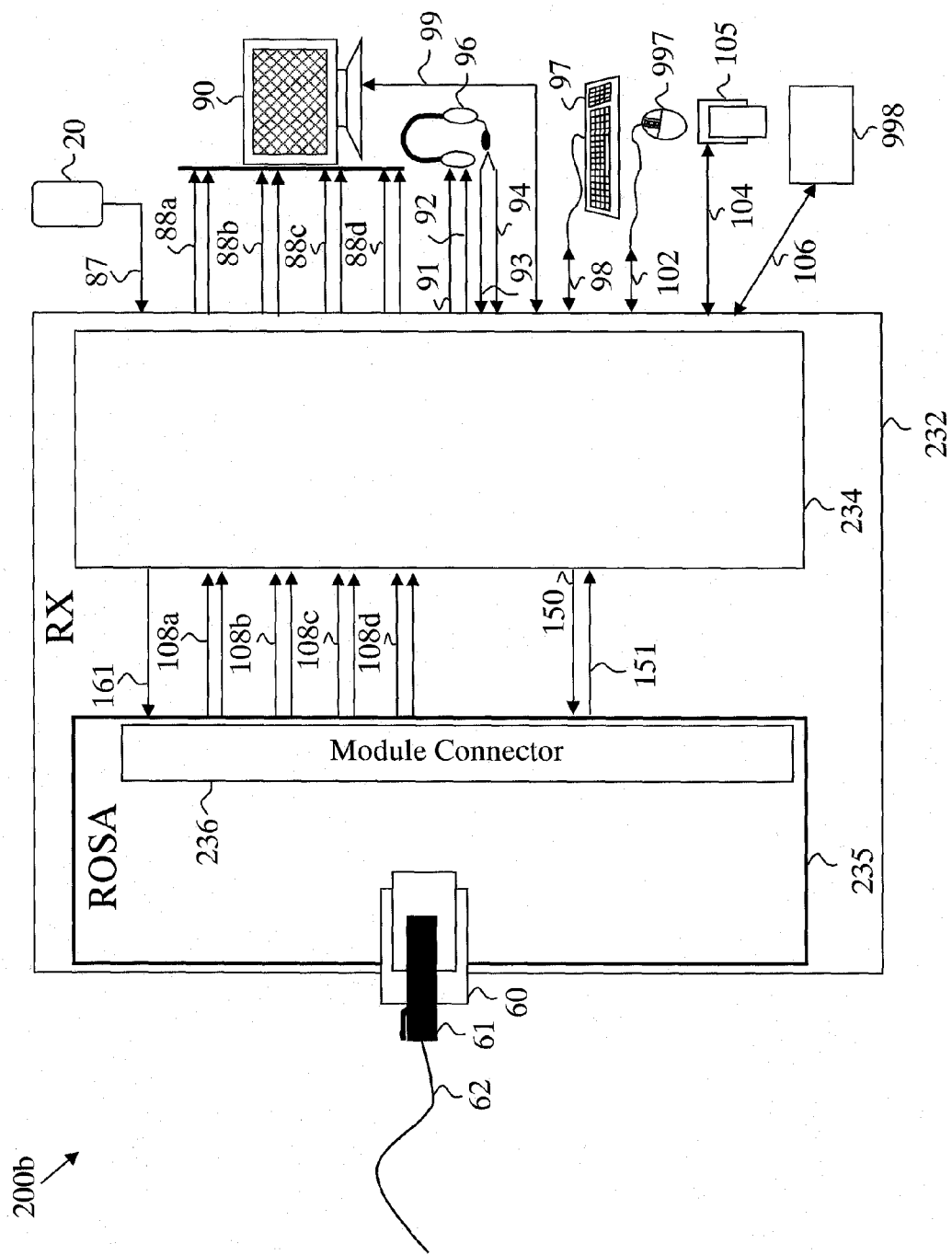
FIG. 4 illustrates a high-level block-diagram of the receiver subsystem of the exemplary embodiment of the present invention illustrated in FIG. 3 above.

FIGS. 3 and 4 illustrate a block diagram of an exemplary embodiment of the current invention having a KVM Extender system 200 similar to system 100 illustrated in FIGS. 1 and 2 above, but this embodiment uses just a single optical fiber media 62 to link between transmitter and receiver subsystems.

A single fiber media tends to reduce deployment cost due to the cost of fibers and the cost of passing these fibers.

FIG. 3 illustrates a high-level block-diagram of the transmitter subsystem 200*a* of an exemplary embodiment of the present invention that provides a KVM Extender transmitter function 202 over a single fiber 62. In this figure the KVM Extender transmitter is coupled to a computer.

Computer 1 is coupled to this fiber optic KVM Extender transmitter through similar cables as in system 100 above.

The Transmitter Optical Assembly (TOSA) 205 is coupled to the KVM Extender transmitter Printed Circuit Board 204 through the TOSA connector 206, and uses an optical Multiplexer/de-multiplexer to operate on six different light wavelengths, all sharing one optical fiber 62.

Various TOSA are available in the market today such as Omron's P1TX6A-SX51x supports HDMI extension through the integration of four high-speed VCSEL for video lanes and additional one low-speed VCSEL and one PIN diode for EDID traffic. This TOSA configuration is suitable for use in an embodiment of the current invention as the symmetrical high-speed link can be used for video formats such as DVI-D single-link, HDMI or DisplayPort and the symmetrical low-speed link may be used for all other data exchange such as keyboard, mouse, EDID, audio in, audio out, control etc. A matching ROSA should be selected to support the exact wavelengths and channel configuration. For example—the Omron P1TX6A-SX51x has a matching ROSA with part number P1RX6A-SX51x that comprises four high-speed PIN Diodes for video and one low-speed VCSEL and one low-speed PIN Diode for data.

Selected TOSA and ROSA preferably should have internal circuitry to interface with the high-speed elements. In TOSA—at least a quad VCSEL driver and in ROSA quad amplifier/receiver. Bandwidth supported by TOSA and ROSA high speed lanes should be at least 3.1 Gbps per lane to support High Definition video. Low speed lanes must support at least one Mbps and preferably five Mbps to support all data traffic and latency requirements.

TOSA 205 receives four electrical differential pairs with video content 212*a* to 212*d* and translates them simultaneously into four different data streams on different light wave lengths using WDM (wavelength-division multiplexing).

Low-speed two-way link in the TOSA 205 enables data exchange for purposes other than video such as EDID, USB and audio through output line 220 and input line 221.

Power to the TOSA is delivered from the KVM Extender transmitter Printed Circuit Board 204 through line 210.

In some embodiments of the current invention, some of the KVM Extender transmitter Printed Circuit Board 204 functions can be done inside the fiber optical transmitter module and some can be done in an independent coupled board. Low speed data exchange lines 220 and 221 coupling the module 205 and the KVM Extender transmitter Printed Circuit Board 204 are typically or optionally implemented through I2C protocol, SPI protocol or through Ethernet.

FIG. 4 illustrates a simplified block diagram of the receiving subsystem 200*b* of an exemplary embodiment of the current invention having a KVM Extender that uses a single optical fiber 62. While system 200*b* is similar to the prior-art system 100*b* of FIG. 2 above; in the current invention, the user console peripherals are coupled to the KVM Extender receiver device 232 that is remotely coupled to computer 1 as shown in FIG. 3 above.

The Receiver Optical Assembly (ROSA) 235 is coupled to the KVM Extender receiver Printed Circuit Board 234 through the ROSA connector 236, and uses an optical Multiplexer/de-multiplexer to operate on six different light wavelengths, all sharing one optical fiber 62. ROSA 235 receives four different data streams on different light wave lengths using WDM (wavelength-division multiplexing) and translates them simultaneously into four electrical differential pairs with video content 108*a* to 108*d*. The KVM Extender receiver Printed Circuit Board 234 translates the incoming video signals into TDMS (Transition-minimized differential signaling) or LVDS (Low-voltage differential signaling) standard signals that are coupled to the user display 90 through differential pairs 88*a* to 88*d*.

Low speed two-way link in ROSA 235 enables data exchange for purposes other than video such as EDID, USB, and audio through output line 150 and input line 151.

In some embodiments of the current invention some of the KVM Extender receiver Printed Circuit Board 234 functions can be performed inside the fiber optical transmitter module and some can be performed in an independent coupled board. Low speed data exchange between the module 235 and the KVM Extender receiver Printed Circuit Board 234 is typically implemented through I²C (Inter-Integrated Circuit) protocol, SPI protocol or through Ethernet.

This embodiment of the current invention system 200 is better than the prior-art system 100 of FIGS. 1 and 2 above as it uses a single optical fiber. Still, it suffers from the following disadvantages that resolved in the exemplary embodiments described in the next figures:

It requires some large and expensive electronic circuitry to process the non-video channels and deliver them over the single fiber through the low-speed link It does not support security or control functions required to enable usage in Secure KVM switch or secure KVM matrix environments.

Additional circuitry consumes more power and therefore typically cannot be powered by USB ports 5*x*.

FIG. 5 illustrates a block diagram of another exemplary embodiment of the current invention KVM Extender system 500*a* having transmitter subsystem and receiver subsystem and a single optical fiber media 62 to link them together. This embodiment of the current invention uses a KVM Extender transmitter module 501 and receiver module 551.

Computer 1 is coupled to the fiber optic KVM Extender transmitter module 501 through similar cables as in systems 100 and 200 above. KVM Extender transmitter module 501 is interfaced directly with the various cables through module connector 502.

Power to the fiber optic KVM Extender transmitter module 501 is coupled through DC lines 503 to the same keyboard USB port 5*a* (in the exemplary embodiment depicted in FIG. 5, three such USB ports 5*a*, 5*b*, 5*c* are seen, respectively connected to lines 30, 32 and 35, but actual number may vary) to power the module from the coupled computer 1 without the need for external power supply. Five Volts is available at all computer 1 USB ports 5*x* and it can deliver at least 500 mA. If more than 500 mA is needed, then power may be extracted from two USB ports to deliver total of 1 A.

Additional optional interfaces provided here compared to prior art system 100 and current invention 200:

1. LED (Light Emitting Diode) output lines 505 to support LED 903 for user indications of device status.

2. RDC (Remote Desktop Controller) port lines 506—a custom serial communication protocol used to interface with Secure KVMs. RDC may be shared with serial port function to reduce the number of cables.

3. Anti-tampering and security I/Os (Inputs/Outputs) 512 to support security features such as active anti-tampering and cryptographic memory.

Some of these additional interfaces may not be used (as shown in this figure) when computer 1 is connected instead of a KVM device.

Unlike the fiber optic KVM Extender transmitters and receivers of FIG. 3 and the embodiment of the current invention of FIG. 4 above, this design uses a highly integrated and self-contained KVM Extender transmitter and receiver modules 501 and 551 respectively, that implements all extender functions internally. The KVM Extender transmitter and receiver Printed Circuit Boards 204 and 234 of FIGS. 3 and 4 above are not needed or minimized as the module of the current invention can interface directly with the coupled computer 1 or through appropriate cabling.

FIG. 6 illustrates a block diagram of an exemplary embodiment of the current invention. KVM Extender system 500b is similar to system 500a of FIG. 5 above, but in this figure, it is coupled to a KVM switch, a KVM switch or KVM matrix 560 instead of computer 1.

It should be noted here that there are KVM switches and KVM Multiplexers that are characterized as being "Secure". Secure KVM is a KVM that passed certain information security certification and typically contains security functions such as USB ports filtering, anti-tampering and unidirectional data diodes. In order to add a KVM Extender to a secure KVM or secure KVM matrix, certain security features should be supported such as:

1. Extension of the anti-tampering subsystem from the KVM into the KVM extender to enable detection of physical intrusion attempts of the KVM Extender.

2. A method of secure pairing of the transmitter subsystem with the receiver subsystem of the KVM Extender to prevent wrong connection or man-in-the-middle attacks.

3. Support for USB filtering scheme that may require separate cable for each USB function (one cable for keyboard, another for mouse and another for user authentication device).

4. Support for unidirectional data flow from keyboard or mouse to the computer.

These security features and others may be optionally implemented or supported in the single optical fiber KVM Extender of the current invention as will be shown herein after.

In FIG. 6, video differential pairs 22a to 22d are coupled into the KVM switch, or KVM matrix 560 console display port 562a.

The DDC lines 28 of the KVM switch or KVM matrix 560 are coupled to the same console display output connector 562b.

Audio output lines 24 and 25 are coupled into the KVM switch or KVM matrix 560 console audio out jack 563. Audio input lines 26 and 27 are coupled into the KVM switch or KVM matrix 560 console audio input jack 564.

Keyboard USB cable 30 is coupled into the KVM switch or KVM matrix 560 console USB keyboard port 565. Power to the fiber optic KVM Extender transmitter module 501 is coupled through 503 to the same keyboard USB port 565 to power the module from the KVM switch or KVM matrix 560 without the need for external power supply.

Mouse USB cable 32 is coupled into the KVM switch or KVM matrix 560 console USB mouse port 566. One USB cable may be used to connect USB keyboard, USB mouse and CAC or mass-storage device through USB hub or composite device implementations to reduce cabling.

RDC cable 506 is coupled into the KVM switch or KVM matrix 560 RDC port 570 to support remote control, monitoring and security of the KVM switch or KVM matrix.

Anti-tampering I/Os 512 may be coupled to small coin battery and anti-tampering sensor 578 to protect the system transmitting subsystem from physical tampering if needed for particular use. The coin battery (see FIG. 13 item 966) and the sensor (see FIG. 13 item 967) are typically attached to the carrier PCB (see FIG. 13 item 963) near the module 501 or 551 to protect the module from tampering.

LED output lines 505 are coupled to a bi-color Link LED 903 to provide clear user indications of the system link status.

The following test refers to the receiver subsystem of system 500b.

User peripherals such as display 90, headset 96 and keyboard 97 are directly coupled to the fiber optic KVM Extender receiver module 551 as in FIG. 5 above.

Remote Desktop Controller unit 109 is coupled through RDC cable 107 to provide user control and access of the KVM switch or KVM matrix 560.

Power to the fiber optic KVM Extender receiver module 551 is provided by external power supply 20 through DC cable 87. Optionally, the fiber optic KVM Extender receiver module 551 may be powered by the RDC 109 though RDC cable 107.

Anti-tampering I/Os 576 may be coupled to small coin battery and anti-tampering sensor 577 to protect the system receiving subsystem from physical tampering if needed for particular use.

LED output lines 575 are coupled to a bi-color Link LED 903 to provide clear user indications of the system link status at the receiver subsystem.

KVM extender system 500b is not only small in size, cost efficient and uses a single fiber, it also provides the additional functionality needed to control a KVM switch or KVM matrix and to properly secure that remote link FIG. 7 illustrates a more detailed block diagram of the fiber optic KVM Extender transmitter module 501 of an exemplary embodiment of the current invention. This example of the current invention transmitter module 501 uses industry standard CWDM (course wavelength-division multiplexing) TOSA 720 such as Omron P1TX6A-SX51x. Other standard or custom TOSA can be used with small design changes.

TOSA 720 comprises the following optical and electrical components:
- 4 High-speed VCSEL (Vertical Cavity Surface Emitting Laser) 722a;
- One low-speed VCSEL 722d;
- Low-speed PIN Diode detector 728;
- Quad VCSEL Driver die 725; and
- Optical multiplexer—de-multiplexer 724.

Ferrule 730 is mechanically aligning and coupling the optical fiber 62 to the multiplexer/de-multiplexer 724. Ferrule 730 is typically made of plastic, Zirconia or ceramic material.

These components are integrated into one sub-assembly (TOSA) 720 on a flexible printed circuit board having a printed FPC (Flex Printed Circuit) connector 750 contacts to provide electrical interfaces. Optical fiber 62 is coupled to the TOSA 720 through Ferrule 730 and a standard LC fiber connector 61 that is attached to the housing 60.

The PIN diode 728 is a special diode with a wide, lightly doped 'near' intrinsic semiconductor region between a p-type semiconductor and n-type semiconductor regions. The p-type and n-type regions are typically heavily doped because they are used for ohmic contacts.

Optical Multiplexer/De-multiplexer 724 is a CWDM optical device that is coupled to the VCSEL 722a to 722d, 727 and PIN detector 728 on one side and to a single optical fiber 62 on the other side. The CDWM 724 multiplexes multiple optical carrier signals on a single optical fiber by using different laser light to carry different signals (also in different directions).

In this embodiment of the present invention, all electrical signals are routed to the fiber optic KVM Extender transmitter module 501 through one electromechanical interface—the module connector 502. Module connector 502 is typically a high-speed high-density connector capable of passing high frequency signals and differential pairs such as digital video and USB.

The module enclosure 501 preferably designed to provide:
Mechanical strength to the delicate components inside;
Alignment the optical components;
ESD (Electro Static Discharge) protection to the ESD sensitive parts inside;
Heat dissipation to the TOSA 720 and other hot parts inside.

The module enclosure 501 is preferably made of metal die casting to fulfill the above functions. Metal enclosure is mechanically attached to carrier PCB using screws or soldered pins.

Video signals from external video source such as computer 1 or KVM switch 560 are coupled through four TMDS lines 7a to 7d or more that passes through the module connector 502. Video interface protocol may be adapted to support standard protocols such as DVI, HDMI, DisplayPort or any other fast digital protocol.

The four TDMS or LVDS lanes 7a to 7d are first passed through an EMI (Electro Magnetic Interference) filter and ESD protection components 772. EMI filter and ESD protection components 772 are preferably low-capacitance type so as to limit their negative effect on the passing video signal quality.

It should be noted that the four TDMS or LVDS lanes may be used for DVI protocol with 3 lanes used for data and one for clock or may be used for DisplayPort interface where all four lanes are having embedded clock. The DisplayPort interface protocol supports 1, 2, or 4 differential data pairs (lanes) in a Main Link, each with a raw bit rate of 1.62, 2.7, or 5.4 Gbit/s per lane with self-clock running at 162, 270, or 540 MHz. Data is 8 b/10 b encoded where each 8 bits of information are encoded with a 10 bit symbol. So the effective data rates after decoding are 1.296, 2.16, and 4.32 Gbit/s per lane (or 80% of the total).

The four TDMS or LVDS lanes 766a to 766d leaving the EMI filter and ESD protection components 772 are passed through optional buffers or level converters 762 where TDMS or LVDS signals are being converted into CML levels and coupled to the TOSA 720 through differential pairs 740a to 740d. Buffers or level shifters 762 may be implemented through AC coupling and terminations or through an active integrated circuit that rescales the incoming video signal to the level required to drive the TOSA Quad VCSEL Driver component 725.

The TOSA Quad VCSEL Driver component 725 is a digitally programmable quad VCSEL driver chip such as Zarlink PX5514 that provides current sources and modulation to drive each coupled high-speed VCSEL 722a to 722d.

For each lane (wavelength) in the TOSA 720, operational parameters such as: modulation current, bias current and current-peaking are programmed through a serial interface by the Laser Driver Control function 732. Laser Driver Control 732 may be implemented by a separate small 8 bit microcontroller, by FPGA, or can be integrated inside the module microcontroller function 755. During module power up process, predefined operational parameters are passed from the Laser Driver Controller function non-volatile memory into the Quad VCSEL Driver 725 inside the TOSA 720 to allow optimal VCSEL 722x performance. The Quad VCSEL Driver 725 also provides the following functions:

Adjustable temperature compensation for VCSEL 722a to 722d bias and modulation current.
VCSEL 722a to 722d fault detection with autonomous fault handling and interrupt.

Four wires serial bus 736 couples the Quad VCSEL Driver 725 control function with the Laser Driver Control 732.

VCSEL 722a to 722d and 727 are semiconductor microlaser diodes that emit light in a cylindrical beam vertically from the surface of a fabricated wafer, and offers significant advantages when compared to the edge-emitting lasers currently used in the majority of fiber optic communications devices.

High-speed VCSEL 722a to 722d are capable of transmitting data throughput of up to 3.5 or more Gb/s per channel.

VCSEL 722a is modulated by TDMS 2 derived by differential pair 7a.
VCSEL 722b is modulated by TDMS 1 derived by differential pair 7b.
VCSEL 722c is modulated by TDMS 0 derived by differential pair 7c.
VCSEL 722d is modulated by CLK derived by differential pair 7d.
VCSEL 735e is low-speed laser modulated by data side channel TX line 756.

All 5 VCSELs and one PIN detector are coupled to an optical multiplexer-de-multiplexer 724 that is made of miniature plastic prisms and filters.

During TOSA 720 final assembly and testing stages, the specific high-speed VCSEL characteristics are recorded. Due to normal variations in laser characteristics, each specific VCSEL minimum and maximum current settings are preloaded into the Laser Driver Control 732 internal non-volatile memory. Once the module 501 is powered up, these unique calibration values are loaded into the TOSA Quad VCSEL Driver 725 to allow normal laser operation.

Low-speed laser driver circuit 723 converts the microcontroller 755 TTL level signal into low speed VCSEL 727 drive current.

Low speed PIN detector 728 output circuit 721 converts the low speed output signal of the PIN detector 728 into a TTL level signal readable by the coupled Transmitter Module Microcontroller 755. These discrete components circuit 721 may be avoided if microcontroller 755 is capable of sampling the non-standard PIN detector 728 signal through internal Analog to Digital Converter (ADC) module—assuming that sampling speed is high enough.

Transmitter Module Microcontroller (TMM) 755 primary functions are:
To manage the outgoing and incoming traffic on the low-speed bi-directional links of the TOSA; and
To interface directly with the connected computer or KVM resources.

The following emulators may be implemented inside the Transmitter Module Microcontroller (TMM) 755 or in separate microcontrollers, depending on specific implementation:

1. Device emulator 756 emulate the EDID EEPROM to provide EDID information that was streamed from user display 90 and coupled through lines 706, lines 28 in the video cable, into computer 1 display port 2 or KVM 560 display port 562. This emulator enables connected device to read EDID content as if display 90 is connected locally.

2. Device emulator 757 emulate the user keyboard based on user keyboard entries streamed from user keyboard 97 and coupled through lines 708 and USB cable 30 into computer 1 USB port 5x or KVM 560 console keyboard port 565.

3. Device emulator 758 emulate the user mouse based on user mouse inputs streamed from user mouse 997 and coupled through lines 710 and USB cable 32 into computer 1 USB port 5x or KVM 560 console mouse port 566.

Lines 711 may be used to connect a user authentication device to the local computer 1 or KVM switch or Matrix 560. Due to security limitations, a separate USB link 711 may be needed to support this option (sometimes called CAC—Common Access Card port).

It should be noted that if security of the peripheral ports is not a critical requirement and if low-speed link is fast enough, emulators described here may be avoided to reduce costs and firmware complexities. Instead, all peripherals are enumerated by coupled computer through transparent communication link. All USB packets are relayed from peripheral device coupled to receiver subsystem to the transmitter subsystem and vice versa.

TMM 755 also handles the bi-directional analog audio streams to support user headset 96. Audio CODEC 770 is a standard consumer type audio CODEC in external part or is integrated inside the TMM chip 755 to reduce costs and size. Stereo analog audio signal is coupled to the Audio CODEC 770 through lines 702 and 703 (left and right cannels). Audio CODEC 770 uses two Sigma-Delta Analog to Digital Converters (DACs) to convert the analog stream into a digital stream that is coupled through lines 771 into the TMM 755. Lines 771 may be AC Link, $I^2C$, $I^2S$ or any other suitable protocol. Once TMM receive these digital streams, it sends them into the receiver subsystem through the low-speed VCSL 727 and single optical fiber 62.

Digital audio from receiver subsystem received through the single optical fiber 62 and low-speed PIN detector 728, is processed by TMM 755 and converted back to CODEC compatible frames. These frames are coupled to the Audio CODEC 770 through link 771. In Audio CODEC 770 digital stream is converted by Digital to Analog Converter (DAC) back into an analog audio signal. This analog signal is passed through lines 704 and 705 to emulate electrets microphone levels. It should be noted that microphone interface in most current PC is mono and one interface line is used to provide microphone DC bias.

TMM 755 is further coupled into crystal or crystal oscillator 768 to generate precise timing and frequencies through internal programmable PLLs. Crystal or oscillator 768 may have internal PLLs to provide other clock signals to other module components.

TMM 755 is coupled to the Laser Driver Control 732 through lines 734 to enable proper system initialization and monitoring. TMM 755 may have Laser Driver Control functions integrated inside to reduce components count.

To reduce the computational load on the TMM chip 755, it is possible to use an additional internal or external communication protocol engine. This allows the use of low-power, lower speed microcontrollers while still supporting the low-speed link data exchange.

TMM chip 755 may have internal or external LAN Physical layer chip or SERDES (Serializer/Deserializer) to support the low speed channel before driver 723 and level shifter 721 (not shown in this figure). Alternatively, internal high speed UART (Universal Asynchronous Receiver Transmitter) may be used to interface with the low-speed channel VCSEL 727 and PIN 728.

TMM 755 internal UART is coupled to serial interface lines 714 to provide a legacy serial link with connected computer 1 or other serial devices. Level-shifter (RS-232 transceiver) may be added to interface between the TMM 755 TTL signal levels and standard RS-232 signal levels. RDC interface lines 712 may share the same UART or use other TMM 755 resources to communicate through serial protocol with KVM switch or KVM Matrix 560.

TMM 755 General Purpose I/O (GPIOs) are used to provide some generic interfaces with input/output signals and to drive status LED 903 through lines 715.

Security function 760 can be a security microcontroller, tampering detector and/or crypto memory that is used to provide additional security functions to protect the system when used in high-security applications. Security function 760 is coupled to the TMM 755 through digital I/O and to external resources through lines 716. These lines may be used to connect an anti-tampering sensor and external battery to support active anti-tampering functions. Some or all security functions 760 may be integrated inside the TMM 755.

5V DC power to the module is supplied through lines 774 that is passed via module connector 502 and connected into internal power supply 765. Internal power supply 765 is a high-efficiency DC to DC converter that reduces the 5V supply into lower voltages needed by other components through lines 764.

The resulted fiber optic KVM Extender transmitter module is very small (for example 66 L×19 W×14 H mm) and provides the complete functionality required to interface with various source equipment such as computers and KVMs.

FIG. 8 illustrates a more detailed block diagram of the fiber optic KVM Extender receiver module 551 of an exemplary embodiment of the current invention. This example of the current invention receiver module 551 uses industry standard CWDM (course wave-division multiplexing) ROSA 820 such as Omron P1RX6A-SX51x. Other standard or custom ROSA can be used with small design changes.

ROSA 820 comprises the following optical and electrical components:
  4 High-speed PIN Diodes 822a to 822d;
  Low-speed PIN diode detector 728;
  Low-speed VCSEL 727;
  Quad TIA/LA Receiver die 825; and
  Optical multiplexer—de-multiplexer 724.

These components are integrated into one sub-assembly (ROSA) 820 on a flexible printed circuit board having a printed FPC (Flex Printed Circuit) connector 850 contacts to provide electrical interfaces. Optical fiber 62 is coupled to the ROSA 820 through Ferrule 730 and a standard LC fiber connector 61 that attached to the housing 60.

The PIN diodes 722x and 728 are special diodes with a wide, lightly doped 'near' intrinsic semiconductor region between p-type semiconductor and n-type semiconductor regions. The p-type and n-type regions are typically heavily doped because they are used for ohmic contacts.

Optical Multiplexer/De-multiplexer 724 is a CWDM optical device that is coupled to the PIN Diodes 822a to 822d, 728 and VCSEL 727 on one side and to a single optical fiber 62 on the other side. The CDWM 724 multiplexes multiple optical carrier signals on a single optical fiber by using different of laser light to carry different signals (also in different directions).

In this embodiment of the present invention, all electrical signals are routed to the fiber optic KVM Extender receiver module 551 through one electromechanical interface—the module connector 552. Module connector 552 is typically a high-speed high-density connector capable of passing high frequency signals and differential pairs such as digital video and USB.

The module 551 enclosure preferably designed to provide:
Mechanical strength to the delicate components inside;
Alignment the optical components;
ESD (Electro Static Discharge) protection to the ESD sensitive parts inside;
Heat dissipation to the ROSA 820 and other hot parts inside.

The module enclosure 551 is preferably made of metal die casting to fulfill the above functions.

Video signals passed via the single optical fiber 62 are converted back into electrical signals by the four high-speed PIN-Diodes 822a to 822d located in the ROSA 820. An embedded Quad Trans-Impedance Amplifier/Limiting Amplifier (TIA/LA) Receiver die 825, interface between the signals received by the PIN Diodes into CML signal level four video lanes 840a to 840d that are passed via the ROSA ZIF connector 850 into the optional High Speed TDMS or LVDS Interface function 862 that converts the four lanes into standard TDMS or LVDS signals. These four standard TDMS or LVDS lanes 866a to 866d are passed through an EMI (Electro Magnetic Interference) filter and ESD protection components 872. EMI filter and ESD protection components 872 are preferably low-capacitance type to limit their negative effect on the passing video signal quality. The four TDMS or LVDS lanes 11a to 11d are then passed through the module connector 552 to drive the connected display 90 (not shown here).

High-speed PIN Diodes 822a to 822d are capable of receiving data throughput of up to 3.5 Gb/s per channel TDMS 2 available on differential pair 11a is detected by PIN Diode 822a.

TDMS 1 available on differential pair 11b is detected by PIN Diode 822b.

TDMS 0 available on differential pair 11c is detected by PIN Diode 822c.

CLK available on differential pair 11d is detected by PIN Diode 822d.

Note that in case of DisplayPort implementation all 4 lanes are caring data.

The Quad Trans-Impedance Amplifier/Limiting Amplifier (TIA/LA) Receiver die 825 is a digitally programmable quad PIN receiver chip such as Zarlink PX5524 that handles the operational parameters of each one of the four high-speed PIN Diodes 822a to 822d.

The Trans Impedance Amplifier in Zarlink PX5524 achieves a nominal 3 GHz bandwidth over a wide range of photodiode input capacitance. Very high channel to-channel isolation ensures data integrity at the receiver sensitivity limits. A global signal detect circuit provides the photodiode reverse bias voltage supply and senses average photocurrent supplied to the photodiode array.

The Trans-Impedance Amplifier is AC-coupled internally to a high-gain, high-bandwidth differential limiting amplifier. The Limiting Amplifier provides a differential back-terminated CML output that can be used to drive four Gb/s per channel transceivers or other CML compatible clock and data recovery circuits. The Limiting Amplifier features an adjustable signal detect circuit that senses optical modulation amplitude (OMA) to provide a received signal indication for each channel.

Optional four wires serial bus 834 couples the Quad Trans-Impedance Amplifier/Limiting Amplifier (TIA/LA) Receiver die 825 control function with the Receiver Module Microcontroller (RMM) 855 to enable fault detection, monitoring and configuration.

Low-speed laser driver circuit 821 converts the RMM 855 TTL level signal into low speed VCSEL 727 drive current.

Low speed PIN Diode detector 728 level-shifter circuit 823 converts the low speed output signal of the PIN detector 728 into TTL level signal that is readable by RMM 855. This discrete components circuit 823 may be avoided if RMM 855 is capable of sampling this signal directly through internal Analog to Digital Converter (ADC) module—assuming that sampling speed is high enough.

Receiver Module Microcontroller (RMM) 855 primary functions are:
To manage the outgoing and incoming traffic on the low-speed two-way links of the ROSA; and
To interface directly with the connected user peripheral devices (some cables, connectors, carrier boards may be needed but no active components).

The following emulators may be implemented inside the Receiver Module Microcontroller (RMM) 855 or in separate microcontrollers depending on specific implementation:

1. Host emulator 856 emulates the computer video controller by reading the coupled display 90 EDID content through lines 806 and then streaming it to the transmitter subsystem through the optical fiber 62. Streamed EDID is then passed to computer 1 display port 2 or to KVM 560 display port 562 to enable display driver Plug and Play automatic configuration.

2. Keyboard Host Emulator 857 emulates the computer in front of the user keyboard 97 that is coupled to the module 551 through lines 808. Keyboard host emulator 857 initially enumerate the coupled keyboard 97 and then receive user inputs from the keyboard 97 and send them through the low-speed VCSEL 727, over the optical fiber 62 into the transmitter subsystem where keyboard device emulator converts it back to USB protocol. That Keyboard device emulator is coupled into computer 1 USB port 5x or KVM 560 console keyboard port 565 to pass user typed data.

3. Mouse Host Emulator 858 emulates the computer in front of the user mouse 997 that is coupled to the module 551 through lines 810. Mouse host emulator 858 initially enumerate the coupled mouse 997 and then receive user inputs from the mouse 997 and send them through the low-speed VCSEL 727, over the optical fiber 62 into the transmitter subsystem where mouse device emulator convert it back to USB protocol. The Mouse device emulator is coupled into computer 1 USB port 5x or KVM 560 console mouse port 566 to pass user mouse commands Lines 811 may be used to connect a user authentication device such as CAC reader and to stream all data inputs and outputs through the low-speed channel to the coupled computer 1 or KVM switch or KVM matrix 560.

It should be noted that a USB hub may be used to integrate all USB lines of the different supported peripherals into one port having one USB cable.

The RMM 855 also handles the bi-directional analog audio streams to support coupled user headset 96. Audio CODEC 770 is a standard consumer type audio CODEC in external part or integrated inside the RMM chip 855 to reduce costs and size. Mono microphone analog signal from user headset 96 is coupled to the Audio CODEC 770 through lines 802 and 803. Audio CODEC 770 uses Sigma-Delta Analog to Digital Converter (DAC) to convert the analog stream into a digital stream that is coupled through lines 771 into the RMM 855. Lines 771 may be AC Link, I²C, I²S or any other suitable protocol. Once RMM 855 receives this digital stream, it sends it into the transmitter subsystem through the low-speed VCSL 727 and single optical fiber 62.

Two channels of digital audio from transmitter subsystem received through the single optical fiber 62 and low-speed PIN detector 728, are processed by RMM 855 and converted back to CODEC compatible frames. These frames are coupled to the Audio CODEC 770 through serial link 771. In Audio CODEC 770, digital streams are converted by two Digital to Analog Converter (DACs) back into two analog audio signals. These analog signals are passed through lines 804 and 805 to the user headset 96 or amplified speakers.

RMM 855 is further coupled into crystal or crystal oscillator 768 to generate precise timing and frequencies through internal programmable PLLs. Crystal or oscillator 768 may have internal PLLs to provide other clock signals to other module components.

RMM 855 is coupled to the ROSA Quad Trans-Impedance Amplifier/Limiting Amplifier (TIA/LA) Receiver die 825 through lines 834 to enable proper system initialization and monitoring.

RMM 855 may have internal or external LAN Physical layer chip or SERDES (Serializer-De-serializer) to support the low-speed channel before driver 821 and level shifter 823 (not shown in this figure). Alternatively internal high-speed UART may be used to interface with the low-speed channel VCSEL 727 and PIN 728.

RMM 855 internal UART is coupled to serial interface lines 814 to provide a legacy serial link with connected peripheral devices. Level-shifter (RS-232 transceiver) may be added to interface between the RMM 855 TTL signal levels and standard RS-232 signal levels. RDC interface lines 812 may share the same UART or use other RMM 855 resources to communicate through serial protocol with Remote Desktop Controller (RDC) device.

RMM 855 General Purpose I/O (GPIOs) are used to provide some generic interfaces with input/output signals and to drive Link LED 903 through lines 815.

Security function 860 can be a security microcontroller, tampering detector and/or crypto memory that is used to provide additional security functions to protect the system when used in high-security applications. Security function 860 is coupled to the RMM 855 through digital I/O and to external resources through lines 816. These lines 816 may be used to connect an anti-tampering sensor and external battery to support active anti-tampering functions. Some or all security functions 860 may be integrated inside the RMM 755.

5V DC power to the module is supplied through lines 874 passed via module connector 552 and connected into internal power supply 865. Internal power supply 865 is a high-efficiency DC to DC converter that reduces the 5V supply into lower voltages needed by other components through lines 864.

The resulted fiber optic KVM Extender receiver module is very small and provides the complete functionality required to interface electrically and directly with a full set of user peripherals needed to remotely operate a computer or a KVM switch or KVM matrix.

FIG. 9 illustrates the transmitter subsystem system diagram 900a of an exemplary embodiment of the current invention 900 having a single fiber optic KVM Extender transmitter dongle. This single fiber optic KVM Extender transmitter dongle 900a uses the fiber optic KVM Extender transmitter module 501 illustrated in FIG. 7 above as its primary component.

The single fiber optic KVM Extender transmitter dongle enclosure 901 is preferably made of plastic over-mold to provide the mechanical strength needed from a large dongle coupled to multiple cables bundle 910.

Cable bundle 910 is entering the single fiber optic KVM Extender transmitter dongle enclosure 901 through strain-relief 905. Cables 910 are preferably short (for example 50 cm) but long enough to provide enough cable flexibility to reach required ports in standard PC or KVM switch.

Internal fiber optic KVM Extender transmitter module 501 penetrates from one side of the enclosure 901 to expose the housing 60 that enables easy access to connect a standard LC connector 61 that couples the fiber media 62.

Optional LED 902 provides user indications of power availability.

Optional LED 903 is Link LED that provides indications about the system link status.

If LED is not illuminated then link is not active.

If LED is blinking green then link is active but the two sides are not paired correctly.

If LED is steady green then link is active and system operating normally.

Cable bundle 910 is divided into several smaller diameter shielded cables:

1. RDC port cable 911 coupled to an RDC male connector 922.

2. USB CAC cable 912 coupled to a Type-A USB plug (yellow colored) 923.

3. USB Power and Keyboard cable 914 coupled to a Type-A USB plug 924.

4. USB mouse cable 925 coupled to a Type-A USB plug 915.

5. Display DVI-D cable 916 coupled to a DVI-D male connector 926.

6. Audio in (Ear) cable 918 coupled to a 3.5 mm stereo plug (lime green colored) 928.

7. Audio out (Mic.) cable 920 coupled to a 3.5 mm stereo plug (pink colored) 930.

Note: optional adapter cable may be added to interface between RDC male connector 922 and standard D-Sub 9 pin female connector to support RS-232 applications if needed.

The inclusion of a USB hub inside the fiber optic KVM Extender transmitter module 501 enables the elimination of two USB cables as USB CAC, keyboard, mouse and power may share a single cable.

The size and power efficiency of the fiber optic KVM Extender transmitter module 501 makes it compatible with a small design such as this dongle form-factor example of the current invention.

FIG. 10 illustrates the receiver subsystem system diagram 900b of an exemplary embodiment of the current invention 900 having a single fiber optic KVM Extender receiver dongle. This single fiber optic KVM Extender receiver dongle 900b uses the fiber optic KVM Extender receiver module 551 illustrated in FIG. 8 above as its primary component.

The single fiber optic KVM Extender receiver dongle enclosure 906 is preferably made of plastic over-mold to provide the mechanical strength needed from a large dongle coupled to multiple cables bundle 907.

Cable bundle 907 is entering the single fiber optic KVM Extender receiver dongle enclosure 906 through strain-relief 905. Cable bundle 907 are preferably short (for example 20 cm) but long enough to provide enough cable flexibility to reach required user desktop peripheral devices. In this case as most peripheral devices are having their own cable, cable bundle 907 may be shorter compared to the transmitter side. In some embodiments some or all the cables are replaced with connectors or ports integrated into the enclosure 906.

Internal fiber optic KVM Extender receiver module 551 penetrates from one side of the enclosure 906 to expose the housing 60 that enables easy access to connect a standard LC connector 61 that couples the fiber media 62.

Optional LED 902 provides user indications of power availability.

Optional LED 903 is Link LED that provides indications about the system link status.

If LED is not illuminated then link is not active.

If LED is blinking green then link is active but the two sides are not paired correctly.

If LED is steady green then link is active and system operating normally.

Cable bundle 907 is divided into several smaller diameter shielded cables:

1. RDC port cable 950 coupled to an RDC female connector 940.
2. USB CAC cable 952 coupled to a Type-A USB jack (yellow colored) 942.
3. USB Power and Keyboard cable 953 coupled to a Type-A USB jack 943.
4. USB mouse cable 954 coupled to a Type-A USB jack 944.
5. Display DVI-D cable 956 coupled to a DVI-D female connector 946.
6. Audio out (Ear) cable 957 coupled to a 3.5 mm stereo plug (lime green colored) 947.
7. Audio in (Mic) cable 958 coupled to a 3.5 mm stereo jack (pink colored) 948.
8. Supply DC input cable 959 coupled to power jack 949.

Note: optional adapter cable may be added to interface between RDC female connector 940 and standard D-Sub 9 pin male connector to support RS-232 applications if needed.

The size and power efficiency of the fiber optic KVM Extender receiver module 551 makes it compatible with a small design such as this dongle form-factor example of the current invention.

FIG. 11 illustrates the transmitter subsystem system diagram 1000*a* of another exemplary embodiment of the current invention 1000 having dual fiber optic KVM Extender transmitter dongle to support dual displays. This dual fiber optic KVM Extender transmitter dongle 1000*a* uses two identical fiber optic KVM Extender transmitter modules 501 illustrated in FIG. 7 above as its primary components.

Primary display transmitter includes all peripherals support while secondary display transmitter includes only support for secondary display EDID.

The transmitter dongle of this example of the current invention is similar to the single fiber module illustrated at FIG. 9 above with the following differences:

1. The dual fiber optic KVM Extender transmitter dongle enclosure 1106 is larger than the enclosure 901 of the single fiber model that presented in FIG. 9 above to fit the two transmitter modules and the thicker cable bundle 1107.
2. Cable bundle 1107 is entering the dual fiber optic KVM Extender transmitter dongle enclosure 1106 through a bigger strain-relief 1105.
3. Housing 1160 is adapted to enable insertion of two LC fiber connectors 61*a* and 61*b* instead of one in housing 60 in FIG. 9 above.
4. There are optionally two Link status LEDs 903*a* for primary display link and 903*b* for secondary display link Link LEDs will show specific indications if fibers are crossed to prevent installation mistakes.
5. There are two DVI cables—primary video cable 916*a* coupled to DVI-D male connector 926*a* and secondary video cable 916*b* coupled to DVI-D male connector 926*b*.
6. Power to the transmitter dongle 1106 is supplied by both keyboard and mouse ports to enable increased power consumption that may be needed for this bigger dongle.

This dual fiber optic KVM Extender transmitter dongle 1106 may support two computers, a single computer with dual head (two video outputs), a dual-link DVI-D single display, a dual head KVM switch or KVM matrix or any other independent video sources.

In some embodiments the two optical fibers 62*a* and 62*b* may be housed in a single sheath to simplify installation.

FIG. 12 illustrates the receiver subsystem system diagram 1000*b* of the exemplary embodiment of the current invention 1000 illustrated in part in FIG. 11 above, having dual fiber optic KVM Extender receiver dongle to support dual displays. This dual fiber optic KVM Extender receiver dongle 1000*b* uses two identical fiber optic KVM Extender receiver modules 551 illustrated in FIG. 8 above as its primary components.

Primary display receiver includes all peripherals support while secondary display receiver includes only support for secondary display EDID.

The receiver dongle of this example of the current invention is similar to the single fiber module illustrated at FIG. 10 above with the following differences:

1. The dual fiber optic KVM Extender receiver dongle enclosure 1108 is larger than the enclosure 906 of the single fiber model that presented in FIG. 10 above to fit the two transmitter modules and the thicker cable bundle 1206.
2. Cable bundle 1206 is entering the dual fiber optic KVM Extender receiver dongle enclosure 1108 through a bigger strain-relief 1205.
3. Housing 1160 is adapted to enable insertion of two LC fiber connectors 61*a* and 61*b* instead of one in housing 60 in FIG. 10 above.
4. There are two Link status LEDs 903*a* for primary display link and 903*b* for secondary display link Link LEDs will show specific indications if fibers are crossed to prevent installation mistakes.
5. There are two DVI cables—primary video cable 956*a* coupled to DVI-D female connector 946*a* and secondary video cable 956*b* coupled to DVI-D female connector 946*b*.
6. Power to the receiver dongle 1108 is supplied by a bigger power supply connected to DC cable 959 through DC jack 949.

This dual fiber optic KVM Extender receiver dongle 1108 may support two single link user displays, one dual-link user display, two display cubes, one display and one projector etc.

FIG. 13 illustrates a side cross-sectional view of the single optical fiber KVM Extender transmitter dongle 900*a* exemplary apparatus of the current invention illustrated in FIG. 9 above. It should be noted that dongles 900*a*-*c* are similarly constructed.

In this figure the connecting cables are not shown to reduce clutter.

The single optical fiber KVM Extender transmitter dongle enclosure 901 is visible here as well as internal components that are not clearly visible in FIG. 9.

Wires 961*x* separated from cable bundle 910 passing through strain relief 905, are soldered in 960*x* to the dongle main carrier Printed Circuit Board (PCB) 960 in points 963*x*. Conductors in the dongle main carrier PCB 960 couples cable signals into the optical fiber KVM Extender transmitter module 501 through module connector 502. This high density SMT (Surface Mount Technology) board to board connector enables easy connection of the module 501 to the PCB 960.

The main carrier PCB 960 may have a coin battery 966 permanently soldered to it or installed in a socket to provide power for the optional anti-tampering security function. A micro-switch or other type of intrusion detector 967 may also be fitted on the main carrier PCB 960 to support the anti-tampering function.

Link LED 903 is an SMT LED soldered to the bottom lower side of the PCB 960 and visible to the user through hole or light-pipe in the plastic over-mold 901.

Inside the optical fiber KVM Extender transmitter module 501 metal enclosure, PCB 962 carries all internal electronic components except for the TOSA 720 that is electrically coupled through ZIF (Zero Insertion Force) connector 750.

The TTM part 755 as well as other SMT components are soldered to the upper and lower side of module PCB 962.

The TOSA 720 is coupled to the optical fiber 62, through LC connector 61 that plugs into the housing 60. Ferrule 730 optically links between the TOSA 720 and the LC connector 61.

Thermal pad 964 improves the heat transfer between the TOSA 720 and the metal enclosure 501.

A metal insert 968 in the plastic over-mold 901 enables improved heat dissipation from the module 501 to the surrounding air.

In some embodiments some or all the cables are replaced with connectors or ports integrated into the enclosure 906.

The optical module selected for the embodiment of the present invention preferably features:
1. Long range as needed for particular application
2. High quality video transmission
3. Very low latency
4. Minimum number of fibers (preferably a single fiber using WDM MUX-Demux)
5. Integrated two-way low-speed data channel It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A Single Optical Fiber KVM system comprising:
   an electro-optical transmitter subsystem that is locally and electrically coupled to a computer, KVM switch or KVM matrix on one side and optically and remotely coupled to a receiver subsystem on the other side, the transmitter subsystem is having:
   a CWDM (Course Wave-Division Multiplexing) optical multiplexer de-multiplexer coupled to a single optical fiber;
   at least two VCSEL Vertical Cavity Surface Emitting Laser devices optically coupled to the CWDM optical multiplexer de-multiplexer;
   at least one PIN Diode device optically coupled to the CWDM optical multiplexer de-multiplexer; and
   at least one microcontroller and additional electronic circuitry to interface said VCSEL and PIN Diode with standard PC video output, keyboard and mouse ports; and
   an electro-optical receiver subsystem that is locally and electrically coupled to user peripherals on one side and optically and remotely coupled to transmitter subsystem on the other side, the receiver subsystem is having:
   a CWDM (Course Wave-Division Multiplexing) optical multiplexer de-multiplexer coupled to the same single optical fiber;
   at least one VCSEL device generating wavelength compatible to transmitter side VCSEL, optically coupled to the CWDM optical multiplexer de-multiplexer;
   at least two PIN Diodes sensitive to the same wavelength as the VCSEL devices in the transmitter side, optically coupled to the CWDM optical multiplexer de-multiplexer; and
   at least one microcontroller and additional electronic circuitry to interface said VCSEL and PIN Diodes with standard set of peripherals having at least one user display, one keyboard and one mouse.

2. The system of claim 1, wherein said electro-optical transmitter and receiver are substantially based on small standard form-factor integrated modules.

3. The system of claim 1, wherein said transmitter subsystem is substantially based on Optical Sub Assembly having:
   Said CWDM optical multiplexer de-multiplexer;
   4×high-speed VCSEL to transmit four digital video lanes;
   4×high-speed VCSEL laser driver circuitry;
   1×low-speed VCSEL to transmit non-video data; and
   1×low-speed PIN Diode to receive non-video data;
   and wherein said receiver subsystem is substantially based on Optical Sub Assembly having:
   said CWDM optical multiplexer de-multiplexer;
   4×high-speed PIN Diodes to receive four digital video lanes;
   4×high-speed PIN Diode receiver circuitry;
   1× low-speed VCSEL to transmit non-video data; and
   1× low-speed PIN Diode to receive non-video data.

4. The system of claim 1, wherein said electro-optical transmitter is further comprising of EDID Extended display identification data emulation function to support automatic detection of display settings, and wherein receiver subsystem is further comprising of means to read coupled display EDID content and deliver it over the said low-speed channel to the said EDID emulation function.

5. The system of claim 1, wherein said electro-optical transmitter is further comprising of a keyboard device emulation function to emulate a keyboard in front of the coupled computer or KVM switch or KVM matrix, and wherein receiver subsystem is further comprising of keyboard host emulator coupled to user keyboard to capture user inputs and deliver it over the said low-speed channel to the said keyboard device emulation function.

6. The system of claim 1, wherein said electro-optical transmitter is further comprising of a mouse device emulation function to emulate a mouse in front of the coupled computer or KVM switch or KVM matrix, and wherein receiver subsystem is further comprising of mouse host emulator coupled to user mouse to capture user inputs and deliver it over the said low-speed channel to the said mouse device emulation function.

7. The system of claim 1, wherein said electro-optical transmitter is further comprising of an audio CODEC function to convert one or more analog audio signals received from the coupled computer or KVM switch or KVM matrix into digital stream and deliver it over the said low-speed channel to the receiver subsystem, and wherein receiver subsystem is further comprising of a similar audio CODEC function coupled to user headset or speakers to receive said digital audio stream and convert it back into one or more analog audio signals.

8. The system of claim 1, wherein said electro-optical receiver is further comprising of an audio CODEC function to convert one or more analog audio signals received from the coupled microphone or audio source into digital stream and deliver it over the said low-speed channel to the transmitter subsystem, and wherein transmitter subsystem is further comprising of a similar audio CODEC function coupled to computer or KVM switch or KVM matrix to receive said digital audio stream and convert it back into one or more analog audio signals.

9. The system of claim 1, wherein said electro-optical receiver is further comprising of a user authentication device port coupled to user authentication device that converts data exchanged with the device into a digital stream and deliver it over the said low-speed channel to the transmitter subsystem and vice versa, and wherein transmitter subsystem is further comprising of a compatible user authentication device port function coupled to computer or KVM switch or KVM matrix to receive said digital stream and convert it back into data structure identical to the data originally exchanged with the user authentication device.

10. The system of claim 1, wherein said electro-optical receiver is further comprising of a Remote Desktop Controller (RDC) port coupled to RDC device that converts data exchanged with the RDC into a digital stream and deliver it over the said low-speed channel to the transmitter subsystem and vice versa, and wherein transmitter subsystem is further comprising of a compatible RDC port function coupled to KVM switch or KVM matrix to receive said digital stream and convert it back into data structure identical to the data originally exchanged with the RDC device.

11. The system of claim 1, wherein said electro-optical receiver is further comprising of a serial communication port function coupled to an external device having serial interface that converts data exchanged with the external device into a digital stream and deliver it over the said low-speed channel to the transmitter subsystem and vice versa, and wherein transmitter subsystem is further comprising of a compatible serial communication port function coupled to computer, KVM switch or KVM matrix to receive said digital stream and convert it back into data structure identical to the data originally exchanged with the external device.

12. The system of claim 1, wherein said electro-optical receiver is further comprising of a general purpose peripheral port function coupled to an external peripheral device that converts data exchanged with the external peripheral device into a digital stream and deliver it over the said low-speed channel to the transmitter subsystem and vice versa, and wherein transmitter subsystem is further comprising of a compatible general purpose peripheral port function coupled to computer, KVM switch or KVM matrix to receive said digital stream and convert it back into data structure identical to the data originally exchanged with the external peripheral device.

13. The system of claim 1, wherein one or more of the said subsystems is powered by external device peripheral port such as USB.

14. The system of claim 1, wherein said one or more subsystems is configured as a dongle having cables permanently attached to it through plastic over-mold.

15. The system of claim 1, wherein said optical fiber is coupled through standard interconnect to enable separation of the optical fiber from the said transmitter or receiver modules.

16. The system of claim 1, wherein said subsystems are further comprises of a security module designed to provide one or more security services selectable from the list of: two side authentication and pairing, traffic encryption decryption, anti-tampering.

17. The system of claim 1, wherein subsystems are further comprising of one or more LEDs to indicate subsystem operational status such as link and power.

18. The system of claim 1, wherein the system further comprising of unidirectional data flow enforcing circuitry coupled to one or more supported user peripherals to reduce data leakages risks.

19. The system of claim 1, wherein subsystems are further comprises of internally powered anti-tampering system to detect an unauthorized attempts to penetrate and tamper with the subsystem internal circuitry.

20. A multiple Optical Fiber KVM system comprising:
two or more electro-optical transmitter subsystems that are locally and electrically coupled to one or more computers, KVM switches or KVM matrixes on one side and optically and remotely coupled to a receiver subsystem on the other side, each having:
a CWDM (Course Wave-Division Multiplexing) optical multiplexer de-multiplexer coupled to a single optical fiber;
at least two VCSEL Vertical Cavity Surface Emitting Laser devices optically coupled to the CWDM optical multiplexer de-multiplexer;
at least one PIN Diode device optically coupled to the CWDM optical multiplexer de-multiplexer; and
at least one microcontroller and additional electronic circuitry to interface said VCSEL and PIN Diode with a standard PC video output, keyboard and mouse ports;
two or more electro-optical receiver subsystems that are locally and electrically coupled to user peripherals on one side and optically and remotely coupled to transmitter subsystem on the other side, each having:
a CWDM (Course Wave-Division Multiplexing) optical multiplexer de-multiplexer coupled to the same single optical fiber;
at least one VCSEL device generating wavelength compatible to transmitter side VCSEL, optically coupled to the CWDM optical multiplexer de-multiplexer;
at least two PIN Diodes sensitive to the same wavelength of the VCSEL devices in the transmitter side, optically coupled to the CWDM optical multiplexer de-multiplexer; and
at least one microcontroller and additional electronic circuitry to interface said VCSEL and PIN Diodes with a standard set of peripherals having at least one user display, one keyboard and one mouse, wherein the two or more set of receiver subsystems are used to drive two or more user display or one or more user displays having a dual-link DVI interface.

* * * * *